US012646047B2

(12) United States Patent
Dalton et al.

(10) Patent No.: US 12,646,047 B2
(45) Date of Patent: Jun. 2, 2026

(54) METHODS AND SYSTEMS FOR TRANSFERRING UNSPENT TRANSACTION OUTPUT (UTXO) TOKENS IN A BLOCKCHAIN NETWORK

(71) Applicant: PayPal, Inc., San Jose, CA (US)

(72) Inventors: Charles Gabriel Neale Dalton, San Jose, CA (US); Liam Julian DiGregorio, Manhattan Beach, CA (US)

(73) Assignee: PAYPAL, INC., San Jose, CA (US)

( * ) Notice: Subject to any disclaimer, the term of this patent is extended or adjusted under 35 U.S.C. 154(b) by 24 days.

(21) Appl. No.: 18/733,045

(22) Filed: Jun. 4, 2024

(65) Prior Publication Data

US 2024/0354744 A1 Oct. 24, 2024

Related U.S. Application Data

(63) Continuation of application No. 17/972,477, filed on Oct. 24, 2022, now Pat. No. 12,033,136, which is a
(Continued)

(51) Int. Cl.
*G06Q 40/00* (2023.01)
*G06Q 20/06* (2012.01)
(Continued)

(52) U.S. Cl.
CPC ..... *G06Q 20/3672* (2013.01); *G06Q 20/0658* (2013.01); *G06Q 20/3678* (2013.01); *H04L 9/0643* (2013.01); *H04L 9/50* (2022.05)

(58) Field of Classification Search
None
See application file for complete search history.

(56) References Cited

U.S. PATENT DOCUMENTS

2016/0260089 A1 9/2016 Chen
2017/0317997 A1 11/2017 Smith et al.
(Continued)

FOREIGN PATENT DOCUMENTS

CN 109863719 A 6/2019
WO 2017178955 A1 10/2017

OTHER PUBLICATIONS

International Preliminary Report on Patentability for Application No. PCT/US2021/064758, mailed on Jul. 6, 2023, 6 pages.
(Continued)

*Primary Examiner* — Olabode Akintola
(74) *Attorney, Agent, or Firm* — HAYNES AND BOONE, LLP

(57) ABSTRACT

Mechanisms for efficiently transferring multiple unspent transaction output (UTXO) tokens in a blockchain network operating a UTXO-based token transaction model are disclosed herein. These methods allow for the use of less computer processing and network bandwidth resources in the transfer of blockchain items, particularly in blockchain schemes with lineage tracking mechanisms (e.g. as may allow for clawback of tokens). Some embodiments comprise generating a delegated account and transferring the UTXO tokens into the delegated account. The ownership of the delegated account can then be transferred to another use of the blockchain network in a single transaction, thereby avoiding the need to individually transfer the UTXO tokens and incur the memory and computational resource burden and costs associated with therewith.

20 Claims, 11 Drawing Sheets

Related U.S. Application Data continuation of application No. 17/217,707, filed on Mar. 30, 2021, now Pat. No. 11,568,393, which is a continuation-in-part of application No. 17/132,590, filed on Dec. 23, 2020, now Pat. No. 11,449,938.

(51) Int. Cl.

| | |
|---|---|
| *G06Q 20/36* | (2012.01) |
| *H04L 9/06* | (2006.01) |
| *H04L 9/00* | (2022.01) |

(56) References Cited

U.S. PATENT DOCUMENTS

| | | | |
|---|---|---|---|
| 2018/0268382 A1* | 9/2018 | Wasserman | H04L 9/3247 |
| 2018/0331832 A1 | 11/2018 | Pulsifer | |
| 2019/0057382 A1 | 2/2019 | Wright et al. | |
| 2019/0130391 A1* | 5/2019 | Wright | G06Q 20/065 |
| 2020/0027067 A1* | 1/2020 | Hertzog | G06Q 20/381 |
| 2020/0050780 A1 | 2/2020 | Uhr et al. | |
| 2020/0202358 A1 | 6/2020 | Mcclelland | |
| 2020/0234257 A1 | 7/2020 | Mallik et al. | |

OTHER PUBLICATIONS

International Search Report and Written Opinion for Application No. PCT/US2021/064758 mailed on May 3, 2022, 9 pages.

Moser M., et al., "Effective Cryptocurrency Regulation Through Blacklisting," Retrieved from Internet URL: https://www.semanticscholar.org/paper/Effective-Cryptocurrency-Regulation-Through-M%C3%B6ser-Narayanan/07ca977361ba58e67f21be53865f4bcf1dcb04ef, Princeton University, last updated on Oct. 3, 2019, 24 pages.

Liu Bowen et al.: "SMACS: Smart Contract Access Control Service", 2020 50TH Annual IEEE/Ifip International Conference On Dependable Systems and Networks (Dsn), IEEE, Jun. 29, 2020 (2020-06-29), pp. 221-232.

Anderson Ross et al.: "Making Bitcoin Legal", Nov. 24, 2018 (2018-11-24), Advances in Databases and Information Systems; [Lecture Notes in Computer Science; Lect.Notes Computer], Springer International Publishing, Cham, pp. 243-253.

European Patent Application No. 21912111.8 European Intellectual Property Office, Examination search report, dated Sep. 30, 2024 12 pages.

Watanabe Hiroki et al: "Enhancing Blockchain Traceability with DAG-Based Tokens", 2019 IEEE International Conference on Blockchain (Blockchain), IEEE, Jul. 14, 2019 (Jul. 14, 2019), pp. 220-227, XP033682642, DOI: 10.1109/BLOCKCHAIN.2019.00036 [retrieved on Dec. 30, 2019] * figure 3 *.

Pingcheng Ruan et al: "Fine-grained, secure and efficient data provenance on blockchain systems", Proceedings of the VLDB Endowment; [ACM Digital Library], Assoc. of Computing Machinery, New York, NY, vol. 12, No. 9, May 2019 (May 2019), pp. 975-988, XP058437871, ISSN: 2150-8097, DOI: 10.14778/3329772.3329775.

Ahmed-Rengers Mansoor et al: "Tendrils of Crime: Visualizing the Diffusion of Stolen Bitcoins", Jan. 7, 2019 (Jan. 7, 2019), pp. 1-12, XP055901750, Retrieved from the Internet: URL:https://arxiv.org/pdf/1901.01769v1.pdf [retrieved on Mar. 15, 2022] *abstract *.

European Patent Application No. 21912111.8 European Intellectual Property Office, Examination search report, dated Dec. 6, 2024, 12 pages.

Ruan P., et al., "Fine-grained, Secure and Efficient Data Provenance on Blockchain Systems," Proceedings of the VLDB Endowment; Acm Digital Library], Association for Computing Machinery, New York, NY, May 2019, vol. 12, No. 9, pp. 975-988, XP058437871, DOI: 10.14778/3329772.3329775.

Watanabe H., et al., "Enhancing Blockchain Traceability with DAG-Based Tokens," 2019 IEEE International Conference on Blockchain Blockchain), IEEE, Jul. 14, 2019, pp. 220-227, XP033682642, DOI: 10.1109/BLOCKCHAIN.2019.00036.

* cited by examiner

500

800

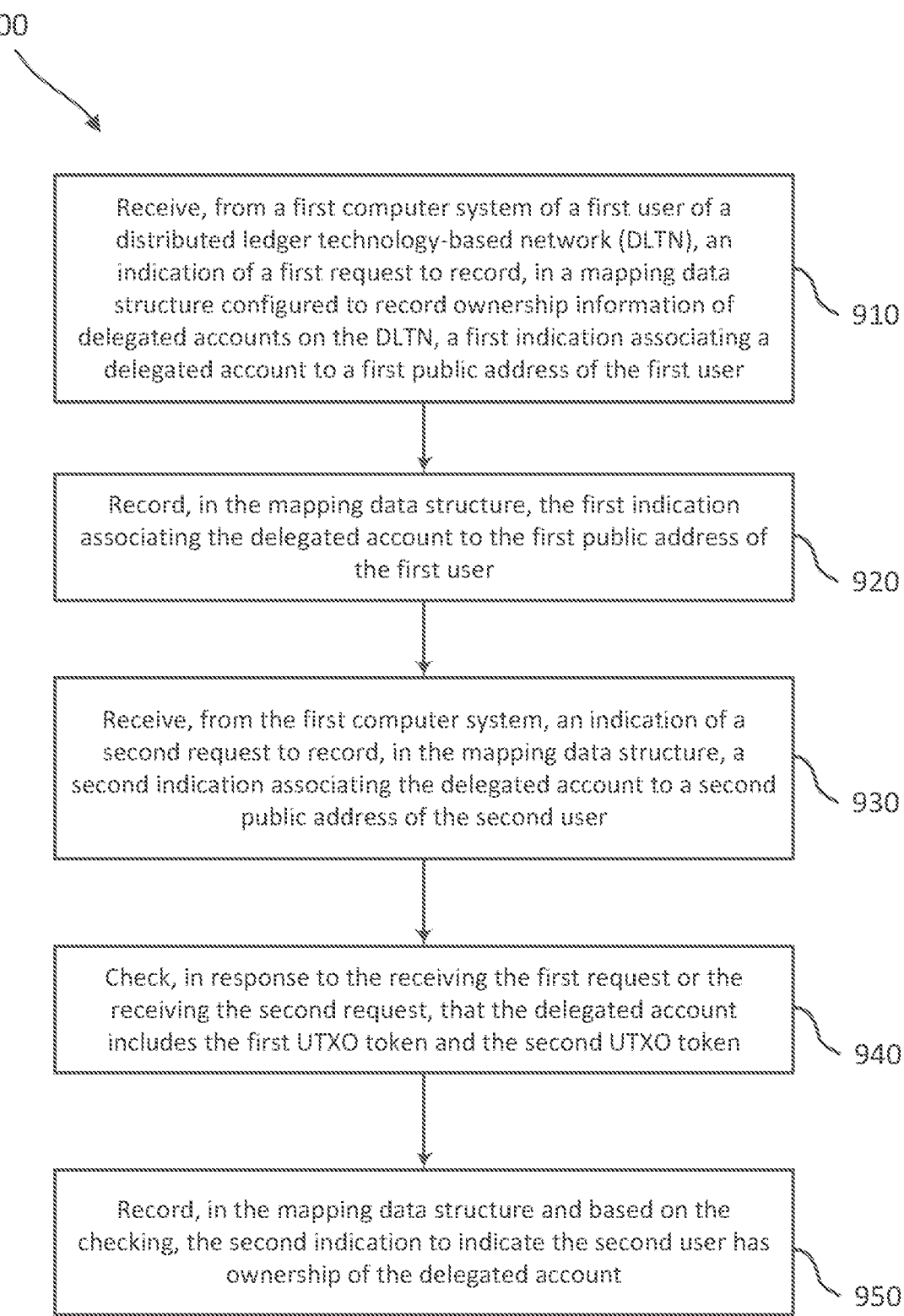

900

Receive, from a first computer system of a first user of a distributed ledger technology-based network (DLTN), an indication of a first request to record, in a mapping data structure configured to record ownership information of delegated accounts on the DLTN, a first indication associating a delegated account to a first public address of the first user

910

Record, in the mapping data structure, the first indication associating the delegated account to the first public address of the first user

920

Receive, from the first computer system, an indication of a second request to record, in the mapping data structure, a second indication associating the delegated account to a second public address of the second user

930

Check, in response to the receiving the first request or the receiving the second request, that the delegated account includes the first UTXO token and the second UTXO token

940

Record, in the mapping data structure and based on the checking, the second indication to indicate the second user has ownership of the delegated account

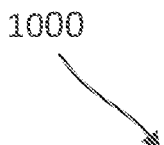

Send, from a first computer system of a first user of a distributed ledger technology-based network (DLTN) to a second computer system of a second user of the DLTN, an indication of a request to transfer ownership of a first UTXO token and a second UTXO token in the DLTN from the second user to the first user ⟍ 1010

Receive, at the first computer system of the first user, a confirmation confirming a recordation, in a mapping data structure configured to record ownership information of delegated accounts on the DLTN, of an indication associating a delegated account to a public address on the DLTN of the first user ⟍ 1020

FIG. 10

METHODS AND SYSTEMS FOR TRANSFERRING UNSPENT TRANSACTION OUTPUT (UTXO) TOKENS IN A BLOCKCHAIN NETWORK

CROSS-REFERENCE TO RELATED APPLICATIONS

The present application is a continuation application of U.S. patent application Ser. No. 17/972,477, filed Oct. 24, 2022, which is a continuation application of U.S. patent application Ser. No. 17/217,707, filed on Mar. 30, 2021 and issued as U.S. Pat. No. 11,568,393 on Jan. 31, 2023, entitled "Methods and Systems for Transferring Unspent Transaction Output (UTXO) Tokens in a Blockchain Network", which is a continuation-in-part (CIP) of the U.S. patent application Ser. No. 17/132,590, filed on Dec. 23, 2020 and issued as U.S. Pat. No. 11,449,938 on Sep. 20, 2022, entitled "Methods and Systems for Transferring Unspent Transaction Output (UTXO) Tokens in a Distributed Ledger Technology-Based Network", the disclosures of each which are hereby incorporated by reference herein in their respective entireties.

TECHNICAL FIELD

The present disclosure generally relates to blockchain networks using a unspent transaction output (UTXO)-based token transaction model, and more specifically, to architectural improvements that improve computer efficiency and execution relating to the transfer of UTXO tokens in such blockchains, according to various embodiments.

BACKGROUND

Distributed ledger-based networks, also known as blockchain networks, utilize transparent and consensus-based verification schemes to validate transactions occurring on the networks. The schemes include verifications of the transactions by at least most of the computing nodes that make up the networks. Each of the computing nodes can keep records of the transactions in a distributed ledger that is extremely difficult to reverse, which allows participants of the networks to at least pseudo-anonymously transact on the networks with confidence about the validity of the transactions. One issue that has arisen with blockchain networks, however, is that their mechanisms do not include typical security and/or access controls found in other electronic transaction systems, and thus may in some circumstances help facilitate illicit activities by virtue of the anonymity or pseudo-anonymity allowed in transacting. Some techniques may allow for the tracking of transactions on the blockchains to curtail or eliminate the illicit activities. For example, tokens used for the transactions may have data structures that allow for the clawing back of tokens used in illicit activities. However, such techniques may also increase the memory and computational resource overhead for legitimate transactions that utilize the tokens.

SUMMARY OF SOME OF THE EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure discloses various embodiments related to the transferring, on a blockchain network, of unspent transaction output (UTXO) tokens that have data structure configured to facilitate the tracking and clawing back of the UTXO tokens. UTXO tokens are distinguishable tokens that are used for transactions occurring on blockchain networks that employ UTXO-based transaction models. A UTXO-based transaction model refers to a transaction accounting model where, as the name implies, UTXO tokens may be considered as unspent outputs of transactions that can be used as inputs in future transactions. For example, if a first user of a blockchain network transfers a UTXO token with a face value of five units to a second user of the blockchain network as a payment for a product or service that costs four UTXO tokens, the transaction may include the deletion of the five-unit UTXO token and in its place the creation of a pair of UTXO tokens, a four-unit UTXO token and a one unit UTXO token, the latter of which may then be provided to the first user as a change (i.e., an unspent output of a transaction). This is in contrast to an account-based accounting model where the payment of four units of (non-UTXO) tokens may be effected by deducting four units of tokens from the account balance of an account of the first user and adding the same amount to the account balance of an account of the second user.

The data structure of UTXO tokens disclosed herein, discussed in more details below, allow for the tracking and clawing back of the UTXO tokens on a blockchain network. One feature of the data structure is that as UTXO tokens are divided into smaller-valued UTXO tokens as parent of transactions, the smaller-valued UTXO tokens do maintain same or at least substantially similar data structure as those of the parent UTXO tokens. For instance, with respect to the above example, the four-unit UTXO token and the one-unit UTXO token may have the same or at least substantially similar data structure as the data structure of the parent five-unit UTXO token. Combining UTXO tokens to create a larger-valued UTXO token may, however, may not result in the child UTXO token having the same data structure as the data structures of the parent UTXO tokens. For instance, the data structure of the UTXO tokens disclosed in the present disclosure have a single entry for logging or recording the identifier of a parent UTXO token. As such, it is not clear or possible to generate a child UTXO token with the same data structure as a parent UTXO token when that child UTXO token is to be obtained by combining two UTXO tokens (i.e., two parents).

As transactions occur in a blockchain network without a mechanism to recombine UTXO tokens into larger-valued ones, UTXO tokens may subdivide into ever smaller-valued UTXO tokens, which may burden user devices as well as the computing nodes of the blockchain network when used in transactions. For example, if a user wishes to pay 10 units of value for a product or a service but possesses hundred UTXO tokens each with a face value of 0.1 unit, then the user has to use her/his user device to request for one hundred transactions on the blockchain network to transfer the hundred UTXO tokens. Further, servers that communicate or interact with the blockchain network to have the transactions validated may have to process as many transactions, and the computing nodes of the blockchain network may have to individually validate the hundred transactions. Such transactions, where multiple UTXO tokens are transferred on a blockchain network to pay or transfer a value in an amount that is the aggregate of the values of the multiple UTXO tokens, are highly inefficient (for example, in comparison to a transaction that transfers a single UTXO token having a face value equaling the aggregate face value) and place a significant burden on the computational and storage resources of the user device, the servers and the network of computing nodes of the blockchain network. Accordingly, there is a need for mechanisms that allow transferring multiple small-valued UTXO tokens without modifying the data structure thereof, as well as without the aforementioned operational inefficiencies and memory, network and computational burden.

Some aspects of the present disclosure disclose a method comprising receiving, at a computer system of a first user of a blockchain network, an indication of a request to provide a second user of the blockchain network ownership of a first UTXO token and a second UTXO token in the blockchain network that are owned by the first user, the blockchain network operating an unspent transaction output (UTXO)-based token transaction model. Further, the method comprises generating, on the blockchain network, a delegated account associated with a first blockchain address on the blockchain network of the first user. In addition, the method comprises causing recordation, in a mapping data structure configured to record ownership information of delegated accounts on the blockchain network, of a first indication associating the delegated account to the first blockchain address of the first user, the first indication indicating the first user has ownership of the delegated account. The method also comprises transferring the first UTXO token and the second UTXO token from an account in the blockchain network associated with the first user to the delegated account. Further, the method comprises causing recordation, in response to the transferring and in the mapping data structure, of a second indication associating the delegated account to a second blockchain address on the blockchain network of the second user. In some embodiments, the second indication indicates the second user has ownership of the delegated account. Further, in some embodiments, the causing recordation of the second indication occurs without execution of a transaction on the blockchain network to individually transfer one or both of the first UTXO token and the second UTXO token to an account in the blockchain network associated with the second user.

Some aspects of the present disclosure disclose a system comprising a non-transitory memory and a hardware processor coupled with the non-transitory memory and configured to read instructions from the non-transitory memory to cause the system to perform operations. The operations comprise receiving, from a first computer system of a first user of a blockchain network, an indication of a first request to record, in a mapping data structure configured to record ownership information of delegated accounts on the blockchain network, a first indication associating a delegated account to a first blockchain address of the first user. In some instances, the blockchain network uses an unspent transaction output (UTXO)-based token transaction model. Further, the first indication indicates that (i) the delegated account includes a first UTXO token and a second UTXO token and (ii) the first user has ownership of the delegated account. The operations further comprise recording, in the mapping data structure, the first indication associating the delegated account to the first blockchain address of the first user. In addition, the operations comprise receiving, from the first computer system, an indication of a second request to record, in the mapping data structure, a second indication associating the delegated account to a second blockchain address of the second user. The operations also comprise checking, in response to the receiving the first request or the receiving the second request, that the delegated account includes the first UTXO token and the second UTXO token. Further, the operations comprise recording, in the mapping data structure and based on the checking, the second indication to indicate the second user has ownership of the delegated account. In some embodiments, the recording the second indication occurs without execution of a transaction on the blockchain network to combine the first UTXO token and the second UTXO token into a single UTXO token.

Some aspects of the present disclosure disclose a non-transitory computer-readable medium (CRM) having stored thereon computer-readable instructions executable to cause a computer system to perform operations. In some embodiments, the operations comprise sending, from a first computer system of a first user of a blockchain network to a second computer system of a second user of the blockchain network, an indication of a request to transfer ownership of a first UTXO token and a second UTXO token in the blockchain network from the second user to the first user. In some embodiments, the first UTXO token includes a first UTXO data structure having a first token identifier uniquely identifying the first UTXO token and a first previous tokens array including ancestral token identifiers of first ancestral UTXO tokens that are lineal ancestors of the first UTXO token. Further, in some embodiments, the second UTXO token including a second UTXO data structure having a second token identifier uniquely identifying the second UTXO token and a second previous tokens array including ancestral token identifiers of second ancestral UTXO tokens that are lineal ancestors of the second UTXO token. In addition, in some embodiments, blockchain network operates an unspent transaction output (UTXO)-based token transaction model. The operations further comprise receiving, at the first computer system of the first user, a confirmation confirming a recordation, in a mapping data structure configured to record ownership information of delegated accounts on the blockchain network, of an indication associating a delegated account to a blockchain address on the blockchain network of the first user. In some embodiments, the delegated account includes the first UTXO token and the second UTXO token. Further, the receiving the confirmation occurs without a change to the first UTXO data structure of the first UTXO token or the second UTXO data structure of the second UTXO token.

These and additional aspects will be appreciated with the benefit of the disclosures discussed in further detail below.

BRIEF DESCRIPTION OF THE DRAWINGS

FIG. 9 is a flowchart illustrating a method of transferring of multiple UTXO tokens using a delegated account according to various aspects of the present disclosure.

FIG. 10 is a flowchart illustrating a method of transferring of multiple UTXO tokens using a delegated account according to various aspects of the present disclosure.

DETAILED DESCRIPTION

Figure 1:
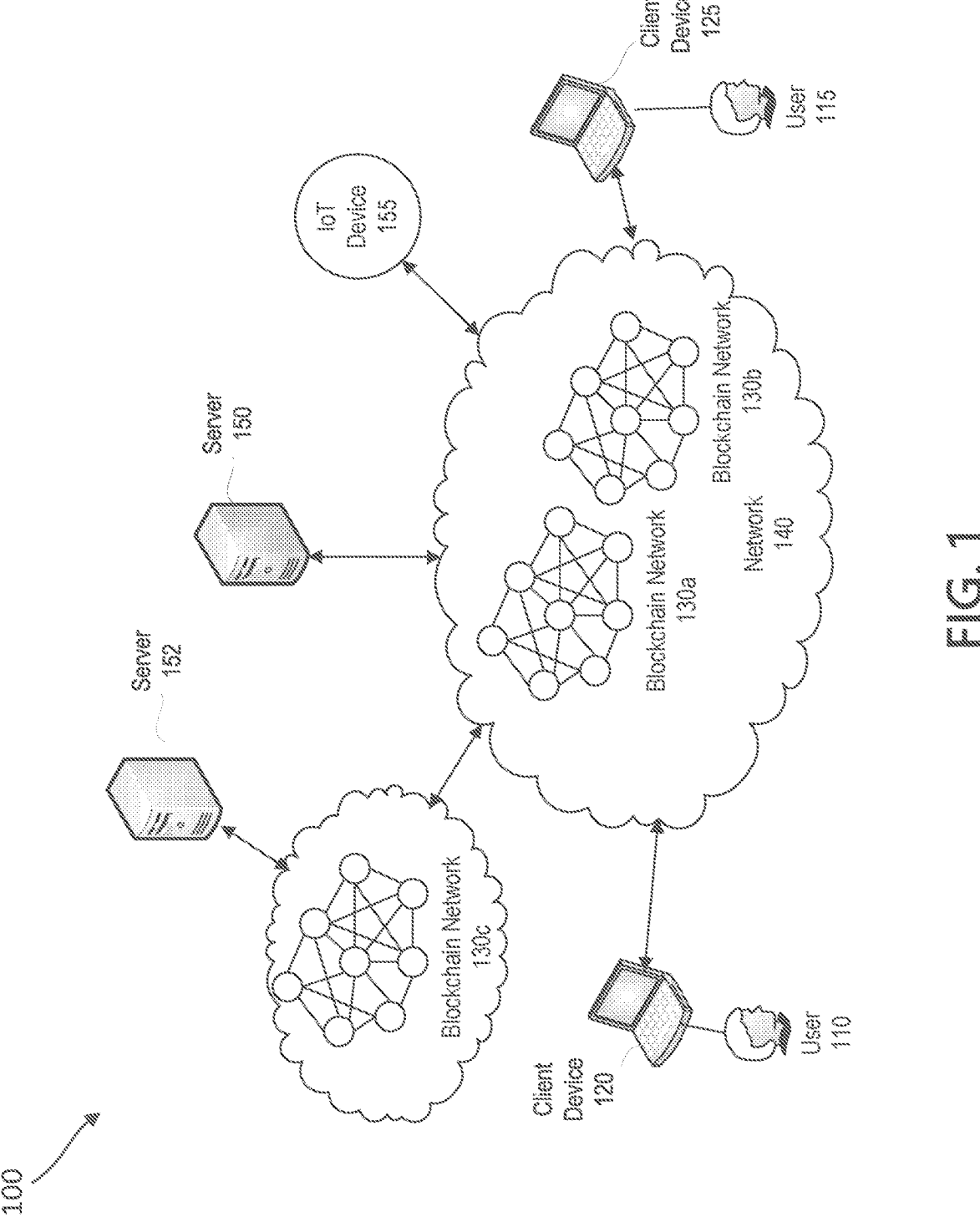
FIG. 1 illustrates an example computing architecture for facilitating one or more blockchain based transactions according to various aspects of the present disclosure.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

In its broadest sense, a blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor and others, the distributed ledger represents each transaction where units of the cryptocurrency are transferred between entities. For example, using a digital currency exchange, a user may buy any value of digital currency or exchange any holdings in digital currencies into fiat currency or other digital currencies. Each transaction can be verified by participants of the peer-to-peer network and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Further, the distributed ledger may be viewed as nearly immutable because to modify the ledger, an agreement of a significant portion of the participants of the peer-to-peer network maintaining the ledgers is needed, which is difficult to obtain when the number of participants is large and the participants themselves are located around the globe. This is due in large part because individuals associated with the nodes that make up the peer-to-peer network have a vested interest in the accuracy and integrity of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is important. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser.

Implementations of the present disclosure will now be described in detail with reference to the accompanying Figures.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

As discussed above, the distributed ledger in a blockchain framework is stored, maintained, and updated in a peer-to-peer network. In one example the distributed ledger maintains a number of blockchain transactions. FIG. 1 shows an example system 100 for facilitating a blockchain transaction according to various aspects of the present disclosure. The system 100 includes a first client device 120, a second client device 125, a first server 150, and an Internet of Things (IoT) device 155 interconnected via a network 140. The first client device 120, the second client device 125, the first server 150 may be a computing device 1100 described in more detail with reference to FIG. 11. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. The network 140 may be any of a variety of available networks, such as the Internet, intranet, local area networks (LANs), wide area networks (WANs), etc., and represents a worldwide collection of networks and gateways to support communications between devices connected to the network 140. The system 100 may also comprise one or more distributed or peer-to-peer (P2P) networks, such as a first, second, and third blockchain network 130_a-c_ (generally referred to as blockchain networks 130). As shown in FIG. 1, the network 140 may comprise the first and second blockchain networks 130_a_ and 130_b_. The third blockchain network 130_c_ may be associated with a private blockchain as described below with reference to FIG. 2, and is thus, shown separately from the first and second blockchain networks 130_a_ and 103_b_. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as the first client device 120 of the first user 110 and the second client device 125 of the second user 115 of in FIG. 1. The server 150 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the server 150 for execution by the blockchain network 130. The server 150 may send the requested transaction to one of the blockchain networks 130 to be validated and approved as discussed below.

Blockchain Network

Figure 2:
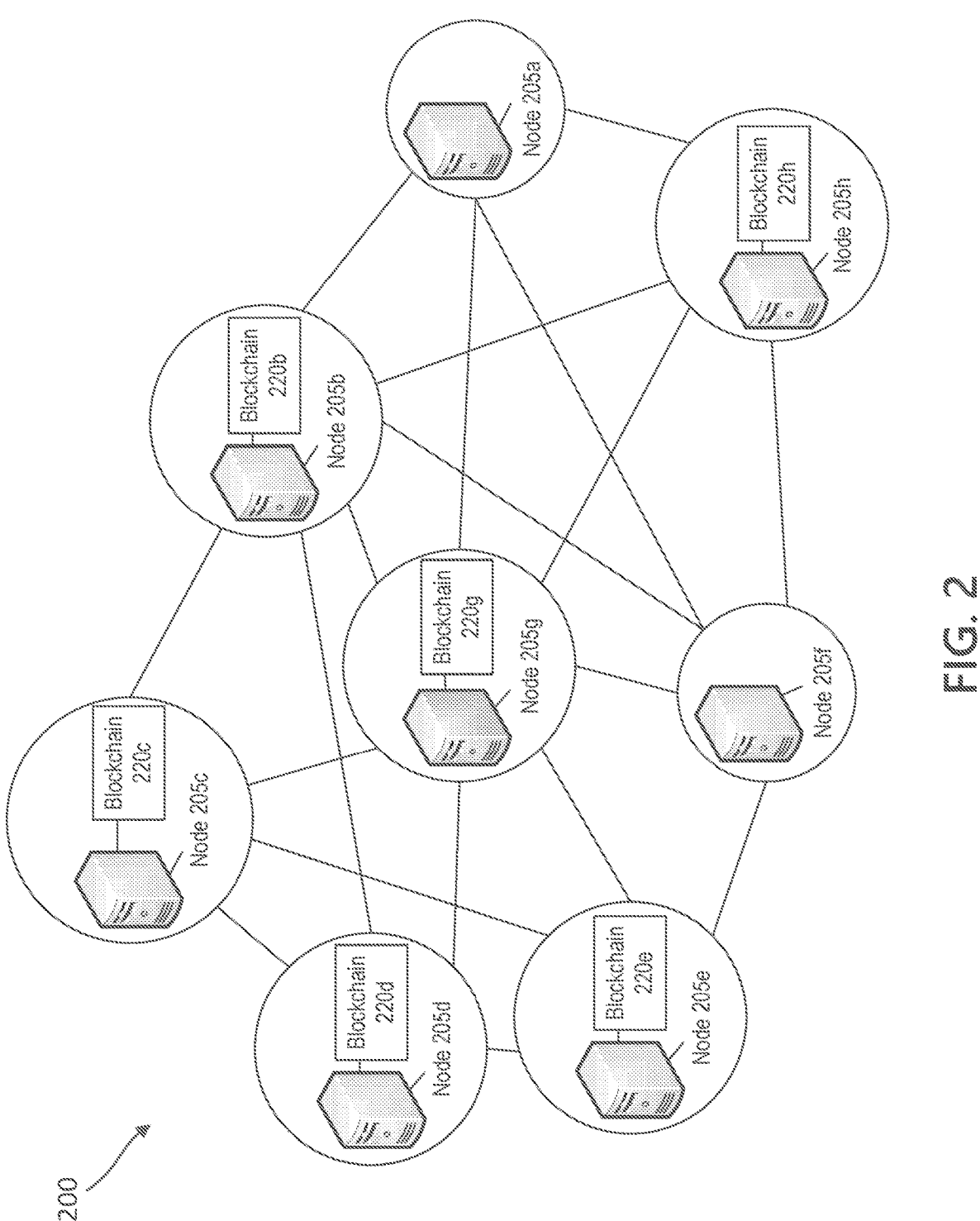
FIG. 2 illustrates an example blockchain network according to various aspects of the present disclosure.
Figure 3:
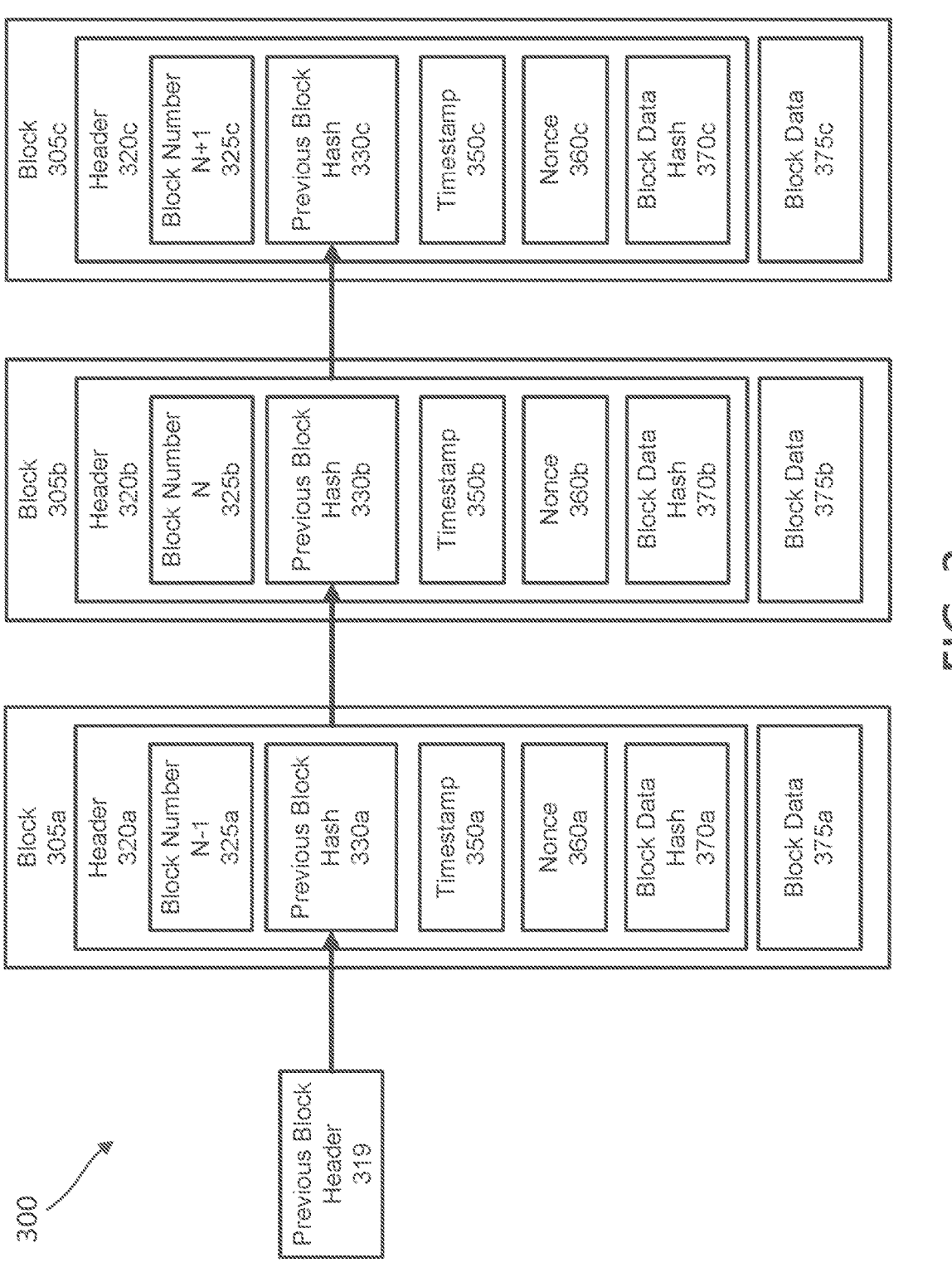
FIG. 3 illustrates an example blockchain according to various aspects of the present disclosure.

FIG. 2 shows an example blockchain network 200 comprising a plurality of interconnected computing nodes or devices 205a-h (generally referred to as nodes 205) according to various aspects of the present disclosure. Each of the nodes 205 may comprise a computing system 1100 described in more detail with reference to FIG. 11. Although FIG. 2 shows a single device associated with each node 205, each of the nodes 205 may comprise a plurality of devices (e.g., a pool). The blockchain network 200 may be associated with a blockchain 220. Some or all of the nodes 205 may replicate and save an identical copy of the blockchain 220. For example, FIG. 3 shows that the nodes 205b-e and 205g-h store copies of the blockchain 220. The nodes 205b-e and 205g-h may independently update their respective copies of the blockchain 220 as discussed below.

Blockchain Node Types

Blockchain nodes, for example, the nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, IoT devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 2, the lightweight nodes 205a and 205f may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization ("blockchain network administrator"). Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals, and the blockchain network 200 and its associated blockchain 220 may be controlled by a central authority (e.g., the blockchain network administrator). Moreover, read permissions for the blockchain 220 may be public or restricted while write permissions may be restricted to a controlling or authorized entity. In contrast to public blockchain networks, as noted above, a private blockchain network may have a central authority, i.e., a blockchain network administrator, managing the transactions occurring on the private blockchain, and participants of the private blockchain network may not be anonymous or pseudo-anonymous as they could be on a public blockchain network. In some cases, users on private or public blockchains may not be fully anonymous because, although the use of a private/public key pair to establish user authenticity during validation of a blockchain transaction provides some privacy as the key pair does not reveal user identity, transactions stored on a blockchain may be visible to the public and user identity may be derived from the publicly available transaction information.

Blockchain

As discussed above, a blockchain 220 may be associated with a blockchain network 200. FIG. 3 shows an example blockchain 300 according to various aspects of the present disclosure. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N−1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 320b of the block N (block 305b) includes a data field (previous block hash 330b) comprising a hash representation of the previous block N−1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360*a-c* is an arbitrary string that is concatenated with (or appended to) the hash of the block. The headers 320 may comprise other data, such as a difficulty target.

The blocks 305 may comprise a respective block data 375*a*, 375*b*, and 375*c* (generally referred to as block data 375). The block data 375 may comprise a record of validated transactions that have also been integrated into the blockchain 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

In one example, a blockchain based transaction may generally involve a transfer of data or value or an interaction between entities and described in more detail below. Referring back to FIG. 1, the server 150 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 4:
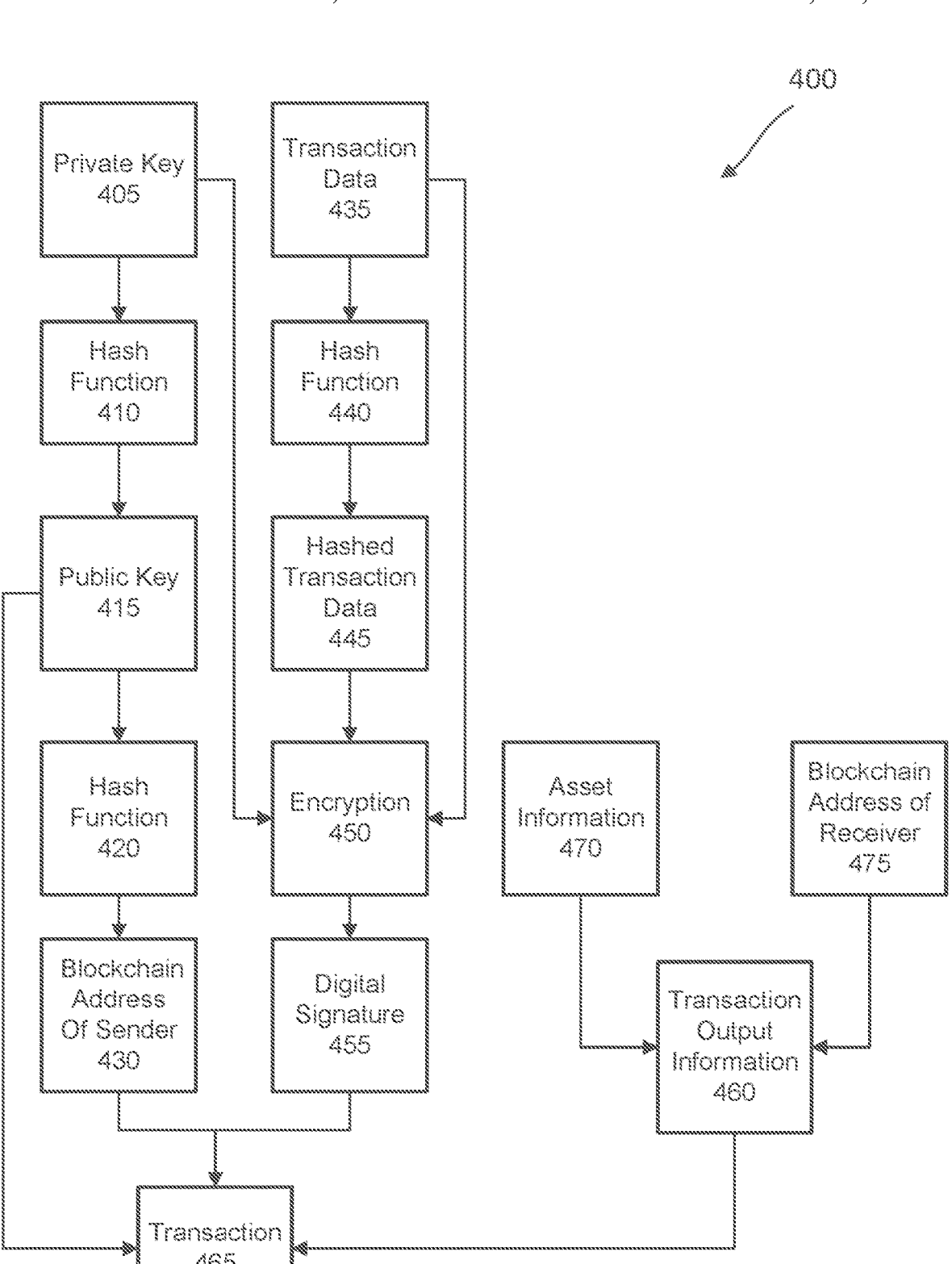
FIG. 4 is a diagram of an example transaction message according to various aspects of the present disclosure.

FIG. 4 is a diagram of a transaction 465 generated by the transaction application according to various aspects of the present disclosure. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a one-way function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 470 and an address or identifier for the second user 450, such as the blockchain address 475. The transaction 465 may be sent from the first client device 125 to the server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 4 as the blockchain address of sender 430, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to allow the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
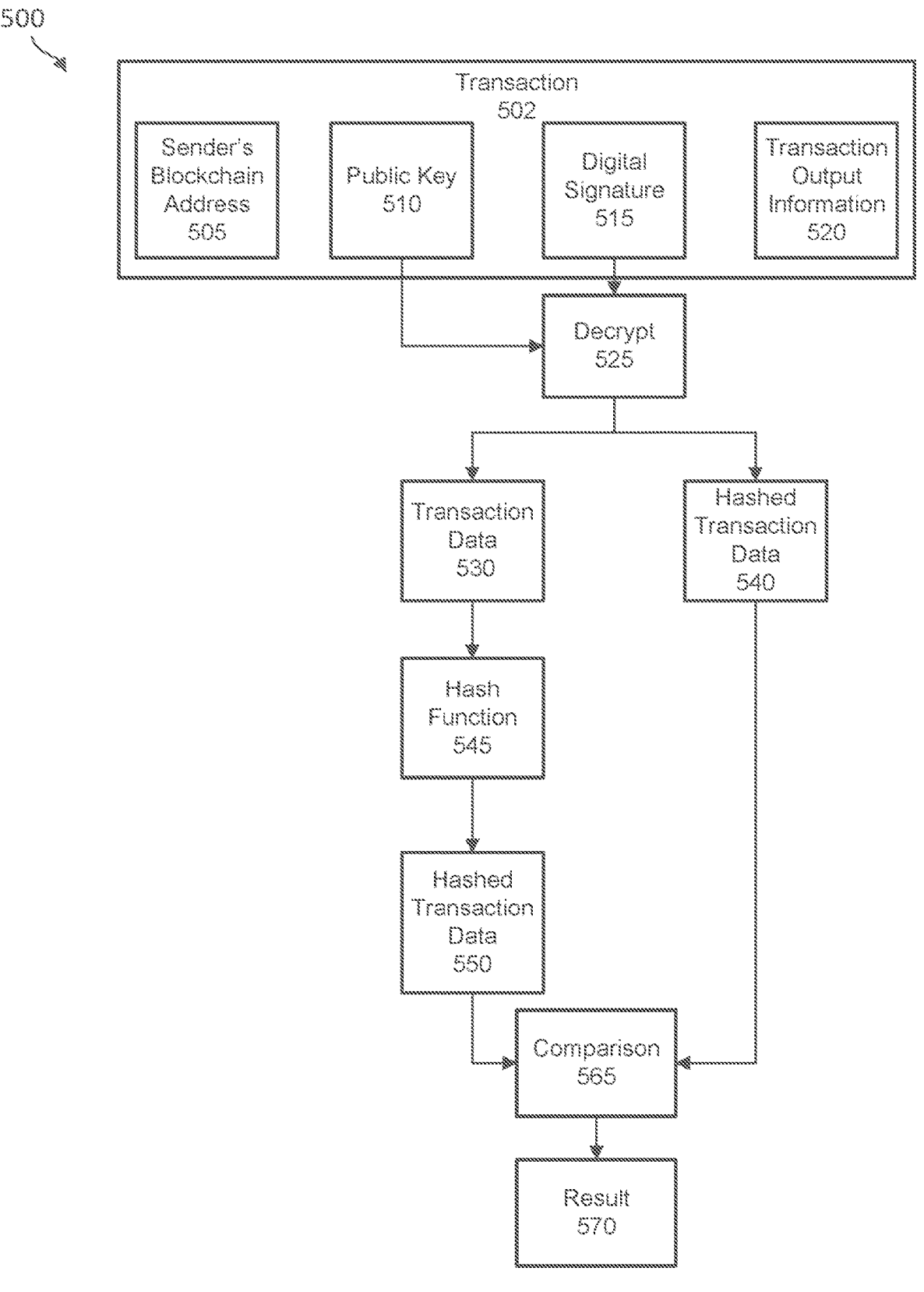
FIG. 5 shows an example transaction broadcast the blockchain network according to various aspects of the present disclosure.

The server 150 may receive transactions from users of the blockchain network 130. The transactions may be submitted to the server 150 via desktop applications, smartphone applications, digital wallet applications, web services, or other software applications. The server 150 may send or broadcast the transactions to the blockchain network 130. FIG. 5 shows an example transaction 502 broadcast by the server 150 to the blockchain network 130 according to various aspects of the present disclosure. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules, referred to as the protocol. The protocol specifies conditions under which a node may accept a transaction, a type of transaction that a node may accept, a type of compensation that a node receives for accepting and processing a transaction, etc. For example, a node may accept a transaction based on a transaction history, reputation, computational resources, relationships with service providers, etc. The rules may specify conditions for broadcasting a transaction to a node. For example, a transaction may be broadcast to one or more specific nodes based on criteria related to the node's geography, history, reputation, market conditions, docket/delay, technology platform, etc. The rules may be dynamically modified or updated (e.g. turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation-User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first user 110 is the originator of the transaction 465 by including digital signature 455.

The node 205 may decrypt the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205a may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user may not have a way to prove ownership of assets. Additionally, anyone with access to a user's public/private keys may access the user's assets. While the assets may be recorded on the blockchain, the user may not be able to access them without the private key.

Publishing and Validating a Block

As discussed above, full nodes 205 may each build their own blocks that include different transactions, and such nodes are referred to as miners when the consensus model for adding the blocks into the blockchain is the so-called proof of work model. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node can create a new block for the blockchain that may include the data for one or more validated transactions (see, e.g., block 375 of FIG. 3). In a blockchain implementation such as Bitcoin, the size of a block is constrained. Referring back to FIG. 3, in this example, the block can include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node can seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by at least a majority of the nodes in the blockchain network, the completed block is added to the blockchain at each participating node.

When a node's block is not added to the blockchain, the block is discarded and the node proceeds to build a new block. The transactions that were in the discarded block may be returned to a queue and wait to be added to a next block.

When a transaction is discarded or returned to the queue, the assets associated with the discarded transaction are not lost, since a record of the assets can exist in the blockchain. However, when a transaction is returned to the queue it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes may get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there may be no blockchain confirmations associated with the transaction. If the transaction is not validated, then the block comprising the transaction may not be added to the blockchain and the transaction may continue to have no blockchain confirmations associated with it. However, if a block comprising the transaction is validated, then each of the transactions in the block may have a blockchain confirmation associated with the transaction. Thus, a transaction in a block may have one blockchain confirmation associated with it when the block is validated. When the block is added to the blockchain, each of the transactions in the block may have two blockchain confirmations associated with it. As additional validated blocks are added to the blockchain, the number of blockchain confirmations associated with the block may increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, proof of elapsed time model, etc.

In a proof of work model, a node may publish the next block by being the first to solve a computationally intensive mathematical problem (e.g., the mathematical puzzle described above involving the hash computations). The solution serves as "proof" that the node expended an appropriate amount of effort in order to publish the block. The solution may be validated by the full nodes before the block is accepted. The proof of work model, however, may be vulnerable to a 51% attack where an individual node or a group of nodes control more than 50% of a blockchain network's computational resources for solving the mathematical problems (i.e., by performing hash computations) and publishing the blocks. In a 51% attack, a blockchain node may intentionally reverse or overwrite transactions and engage in double-spending. When a node generates a valid block of transactions, it broadcasts the block to the network for validation. In some cases, a node or group of nodes controlling more than 50% of a network's computational power may publish blocks in private without broadcasting them to the network. In such a scenario, the rest of the network may follow a public version of the blockchain while the controlling node may be following its private version of the blockchain.

The proof of stake model is generally less computationally intensive than the proof of work model. Unlike the proof of work model which is open to any node having the computational resources for solving the mathematical problem, the proof of stake model is open to any node that has a stake in the system. The stake may be an amount of cryptocurrency that the blockchain network node (i.e., user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g. in the context of a corporate environment), a hybrid blockchain network may switch to be between completely or partially permissioned and permissionless. The network may switch based on various factors, such as latency, security, market conditions, etc.

Smart Contracts

A smart contract is an agreement that is stored in a blockchain and automatically executed when the agreement's predetermined terms and conditions are met. The terms and conditions of the agreement may be visible to other users of the blockchain. When the pre-defined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first user 110 (also referred to as tenant 110) may rent an apartment from the second user 115 (also referred to as landlord 115). A smart contract may be utilized between the tenant 110 and the landlord 115 for payment of the rent. The smart contract may indicate that the tenant 110 agrees to pay next month's rent of $1000 by the 28<sup>th</sup> of the current month. The agreement may also indicate that if the tenant 110 pays the rent, then the landlord 115 provides the tenant 110 with an electronic receipt and a digital entry key to the apartment. The agreement may also indicate that if the tenant 110 pays the rent by the 28<sup>th</sup> of the current month, then on the last day of the current month, both the entry key and the rent are released respectively to the tenant 110 and the landlord 115.

Smart contracts may execute based on data received from entities that are not on the blockchain or off-chain resources. For example, a smart contract may be programmed to execute if a temperature reading from a smart sensor or IoT sensor falls below 10 degrees. Smart contracts may not be able to pull data from off-chain resources. Instead, such data may be pushed to the smart contract. In some cases, third party services may be utilized to retrieve off-chain resource information and push this to the blockchain. These third-party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract.

Tokens

A token may refer to an entry in the blockchain that belongs to a blockchain address, alternatively referred to as a blockchain account. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to crypto-currency that is used for a specific purpose or may represent ownership of a real-world asset, such as fiat currency or real-estate. The person that owns the private key correspond-ing to the blockchain address may access the tokens at the address. Thus, the blockchain address may represent an identity of the person that owns the tokens. In some cases, only the person or entity with the private key, i.e., the owner of the blockchain address, may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the recipient user, and the recipient user, represented on the blockchain by its blockchain address, may then be considered as the new owner of the token (e.g., and also the owner of the real-world asset that is represented on the blockchain by the token).

Tokens exchanged on a blockchain network can be unspent transaction output (UTXO) tokens, i.e., the block-chain network may be operating a UTXO token-based transaction model to account for transactions occurring on the blockchain network, in contrast to an account-based transaction model. In the latter model, a blockchain network may have accounts or wallets each having associated an "account balance" specifying the number of (non-UTXO) tokens or cryptocurrency stored therein. The stored tokens can be fungible, i.e., any one token in the account may be indistinguishable from any other token in the account and the account balance represents the total sum of the indistin-guishable tokens stored in the account. In such cases, the transfer of an authorized number of tokens from a first account to a second account on a blockchain network includes reducing the account balance in the first account by the authorized number of tokens and increasing the account balance in the second account by the same or less (e.g., less due to transaction fees, transfer fees, etc.) number of tokens. For example, if a first account has an account balance of ten tokens and the owner of the first account authorizes the transfer of eight tokens to a second account, the transfer includes the steps of decrementing eight tokens from the account balance of the first account and increasing the account balance of the second account by eight tokens, without having to distinguish or determine "which eight tokens of the ten tokens" in the first account are transferred to the second account.

In some aspects, an account on a blockchain network operating a UTXO token-based transaction model may not have an "account balance" in the sense of "account-based transaction model" discussed above, but rather a collection of UTXO tokens with same and/or different face values that add up to an aggregate amount of UTXO tokens for that account. In such cases, the UTXO tokens may be distin-guishable from each other at least by their face values and transferring a given amount of UTXO tokens from a first account to a second account on the blockchain network may include keeping track of the UTXO tokens that are trans-ferred to the second account. As an illustrative example, an account on a blockchain network operating a UTXO token-based transaction model may have stored therein a collection of UTXO tokens having different face values, including two UTXO tokens with a face value of five units of the UTXO token, a seven-unit UTXO token and a half-unit UTXO token. In such cases, the account can be deemed to have an aggregate value of 2×5+7+0.5 units=17.5 units of UTXO tokens, but not an "account balance" in the sense of the term as discussed above with respect to the account-based model. This is because the UTXO tokens can be distinguishable from each other (e.g., the half-unit UTXO token is distin-guishable from the seven-unit UTXO token, and as such there is no "account balance" from which some number of UTXO tokens can be decremented as discussed above with respect to account-based models). For instance, an owner of an account storing the UTXO tokens of the above example and wishing to transfer eight units of UTXO tokens to another account may achieve the owner's goal by transfer-ring either the two five-unit UTXO tokens and receiving a three-unit UTXO token change or one of the five-unit UTXO token and the seven-unit UTXO token and receiving a four-unit UTXO change. In some cases, instead of trans-ferring a pair of UTXO tokens and receiving a change, the pair of UTXO tokens may be deleted or burned and in their place another pair of UTXO tokens with a face value equaling eight units and the change may be created or minted (e.g., and then the eight-unit UTXO token can be transferred to the second account). In other words, in con-trast to account-based token transaction models, a transfer of eight units of UTXO tokens from a first account on the blockchain network to a second account may not be accom-plished by simply decrementing eight units of UTXO tokens from the aggregate value of the first account and increasing the aggregate value of the second account by the same or less units of UTXO tokens.

The non-fungibility of UTXO tokens can be advantageous for entities that are tasked with regulating the use of the blockchain networks, for instance, entities such as block-chain network administrators that are tasked with monitor-ing the blockchain networks for illegal activities. This is because UTXO tokens can be distinguishably identified from each other based on at least their face values and the entity monitoring the blockchain network may be able to distinguish UTXO tokens that are determined to have been used for illicit activities (i.e., "tainted" UTXO tokens) from those that have not been determined to have been used for illicit activities (i.e., "clean" UTXO tokens). For example, if a seller receives into a first account on a blockchain network three clean UTXO tokens from an account of a first buyer and six tainted UTXO tokens from an account of a second buyer (e.g., increasing the aggregate value of the first account by 3+6=9 units of UTXO tokens), an entity monitoring the blockchain network may be able to identify which of the UTXO tokens in the account of the seller are tainted. In comparison, if the blockchain network was operating an account-based transaction model and the tokens were non-UTXO tokens, the tokens would commingle in the first account and the monitor may not be able to identify which of the 9 units of tokens were the tainted tokens. The challenge of identifying tainted tokens can becomes even more acute as more transactions involving the tokens occur in the blockchain network and the tokens propagate throughout the blockchain network. For instance, if the owner of the first account transfers two units of tokens (i.e., out of the 9 units of tokens) to another account, the monitoring entity may not be able to determine whether the two transferred tokens were all clean, all tainted or a combination thereof, and as such may be unable to identify the tainted tokens (e.g., and would be unable to take appropriate action such as clawing back the tainted tokens).

Figure 6:
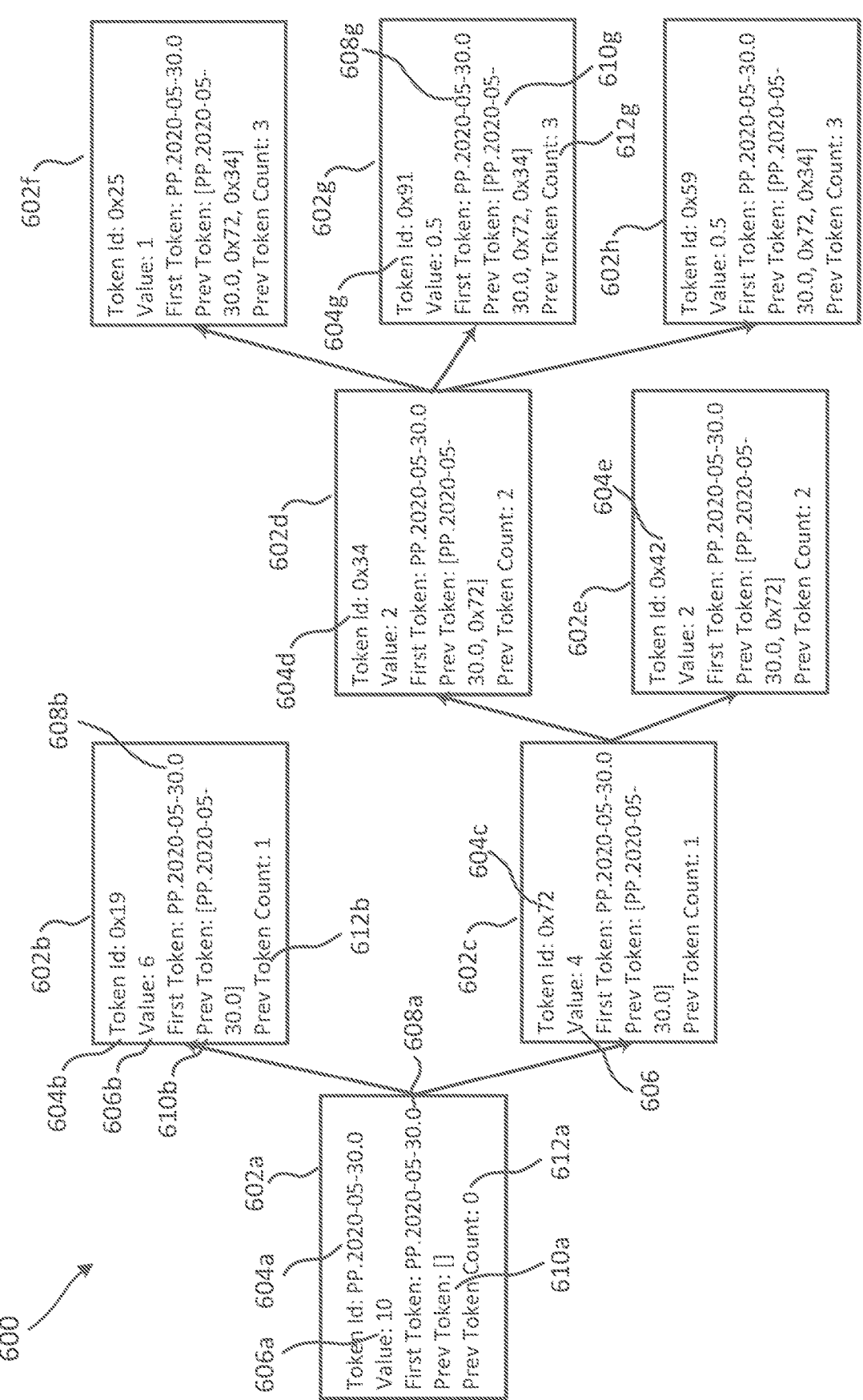
FIG. 6 is an example illustration of the generation of unspent transaction output (UTXO) tokens in a blockchain operation UTXO-based transaction model according to various aspects of the present disclosure.

UTXO tokens with data structures configured to allow a blockchain network administrator to identify, track and/or clawback the UTXO tokens on a blockchain are shown in FIG. 6, which shows an example illustration of the generation of such UTXO tokens in a blockchain network operating an unspent transaction output (UTXO)-based transaction model, according to various aspects of the present disclosure. In some embodiments, the data structure of such given UTXO token (e.g., any one of the family of UTXO tokens 602a-602h) in a blockchain network may include a UTXO token identifier, a value of the given UTXO token, an identifier of the initial or genesis UTXO token in the blockchain from which the given UTXO token is derived, the identifiers of the ancestral UTXO tokens between the genesis UTXO token inclusive and the given UTXO token, the number of the ancestral UTXO tokens, etc. The use of the data structure of the UTXO tokens, discussed in more details below, to identify, track and/or clawback the UTXO tokens is discussed in Applicant's U.S. patent application Ser. No. 17/132,590, filed Dec. 23, 2020, titled "Methods and Systems for Transferring Unspent Transaction Output (UTXO) Tokens in a Distributed Ledger Technology-Based Network," the disclosure of which is hereby incorporated by reference herein in its entirety.

In some embodiments, a UTXO token (e.g., such as one of the family of UTXO tokens 602a-602h) may be introduced into a blockchain network by a blockchain network administrator that issues an initial or genesis UTXO token 602a which spawns the family of UTXO tokens 602a-602h. The genesis UTXO token 602a may include a genesis token identifier 604a uniquely identifying the genesis UTXO token 602a on the blockchain network, a genesis UTXO token amount indicator 606a indicating the value of the genesis UTXO token 602a, a first token identifier 608a identifying the first token of the family of UTXO tokens 602a-602h, a previous-tokens array 610a listing the identifiers of ancestral UTXO tokens that preceded the genesis UTXO token 602a, i.e., the identifiers of UTXO tokens that existed in the ancestral line from the first UTXO token of the family of UTXO tokens 602a-602h to the genesis UTXO token 602a, and a previous-tokens count indicator 612a indicating the number of the ancestral UTXO tokens since the start of the family of UTXO tokens 602a-602h. For the genesis UTXO token 602a, in some cases, the first token identifier 608a is same as the genesis token identifier 604a, the previous-tokens array 610a may be empty and the previous-tokens count indicator 612a indicates a value of zero, all because the genesis UTXO token 602a is the first UTXO token of the family. In some aspects, UTXO tokens that are in the ancestral line from a genesis UTXO token to a given UTXO token may also be referred as the lineal ancestors of that given UTXO token (e.g., and the term "lineal ancestors" may also include the genesis UTXO token).

In some embodiments, multiple "child" UTXO tokens of a "parent" UTXO token may be generated by partitioning the parent UTXO token having some value into multiple child UTXO tokens with values totaling the value of the parent UTXO token. For example, in FIG. 6, the genesis UTXO token with a value of 10 (e.g., in some arbitrary unit) is partitioned into two child UTXO tokens 602b, 602c having a value of 6 and 4, respectively. In some embodiments, the child UTXO tokens 602b, 602c may have same or substantially similar data structure as that of the genesis UTXO token 602a discussed above. That is, for example, child UTXO token 602b may include a child token identifier 604b uniquely identifying the child UTXO token 602b on the blockchain network, a child UTXO token amount indicator 606b indicating the value of the child UTXO token 602b, a first token identifier 608b identifying the first token of the family of UTXO tokens 602a-602h, a previous-tokens array 610b listing the identifiers of the ancestral UTXO tokens that preceded the child UTXO token 602b and a previous-tokens count indicator 612b indicating the number of ancestral UTXO tokens since the start of the family of UTXO tokens 602a-602h. Other child UTXO tokens, such as child UTXO token 602c that is a child of the genesis UTXO token 602a, child UTXO tokens 602d, 602c that are children of the UTXO token 602c, child UTXO tokens 602f, 602g, 602h that are children of the UTXO token 602d, etc., may each have a data structure same or substantially similar as discussed above with respect to child UTXO token 602b. Although the child UTXO token generation process is illustrated below with reference to the generation of child UTXO token 602b from its parent UTXO token, i.e., the genesis UTXO token 602a, in some cases, the same process can be applied to generate any child UTXO token.

In some embodiments, the process of generating multiple child UTXO tokens from a parent UTXO token may include the computation of child token identifiers based on the token identifier of the parent UTXO token. That is, in some embodiments, a child token identifier that uniquely identifies a child UTXO token on a blockchain network may be computed based on the token identifier of the parent UTXO token of the child UTXO token. For example, the child token identifier 604b that uniquely identifies the child UTXO token 602b on the blockchain network may be computed based the token identifier of the parent UTXO token, i.e., the genesis token identifier 604a of the genesis UTXO token 602a. For instance, a hashing algorithm that intakes as an input, among other things, the parent token identifier may be used to compute the child token identifier that uniquely identifies the child UTXO token on the blockchain network. In some cases, when generating child token identifiers for child UTXO tokens of the same parent UTXO token, the hashing algorithm may also intake as an input a unique index so that different child UTXO tokens corresponding to different indices may have different (and unique) child token identifiers. Expressed mathematically, the child token identifier Token_IDchild=H(Token_ID$_{parent}$, index), where His a hashing function or algorithm and index is, for instance, an alphanumeric value unique to the child UTXO token (e.g., unique compared to the other child UTXO tokens of the same parent UTXO token) and selected from an index list (e.g., a list of whole or natural numbers, a list of distinct alphanumeric values, etc.). For example, the child token identifier 604*b* of child UTXO token 602*b* may be computed using the equation H(PP.2020–05–30.0, 0)=0×19, where index=0 is associated with child UTXO token 602*b* and is selected from an index list of whole numbers. In some cases, the child token identifiers of other child UTXO tokens of the same parent token may be computed similarly but with different indices. For example, the child token identifier 604*c* of child UTXO token 602*c* that is a child of the same parent UTXO token 602*a* may be computed as H(PP.2020– 05–30.0, 1)=0×72, where index=1 is associated with child UTXO token 602*c*. In such cases, child token identifiers of additional child UTXO tokens (e.g., of the same parent UTXO token) may be computed using the same equation as above but with index=2,3, . . . , Although the discussion above about computing child token identifiers of child UTXO tokens of a given parent UTXO token is presented with respect to parent UTXO token 602*a* (and child UTXO tokens 602*b*, 602*c*), in some embodiments, the discussion equally applies to all other parent and child UTXO tokens in the blockchain network (e.g., parent UTXO token 602*c* and child UTXO tokens 602*d*, 602*c*, or parent UTXO token 602*d* and child UTXO tokens 602*f*, 602*g*, 602*h*).

In some embodiments, the process of generating multiple child UTXO tokens by partitioning a parent UTXO token on a blockchain network may include verifying that the total aggregate value of the child UTXO tokens is equal to the value of the parent UTXO token and deactivating or invalidating the parent UTXO token on the blockchain network so that no new or additional token value is introduced on the blockchain network as a result of the partitioning of the parent UTXO token. For example, FIG. 6 shows an example generation of child UTXO tokens 602*b*, 602*c* by partitioning the genesis UTXO token 602*a* into two. In such cases, the total aggregate value of the child UTXO tokens 602*b* and 602*c*, i.e., the sum of the values indicated by the child UTXO token amount indicators 606*b* and 606*c* is equal to the value indicated by the genesis UTXO token amount indicator 606*a*. Further, with the generation of the child UTXO tokens 602*b* and 602*c* on the blockchain network, the parent UTXO token, i.e., the genesis UTXO token 602*a*, may be rendered invalid or expired. Although the discussion above about verifying that the total aggregate value of child UTXO tokens is equal to the value of the parent UTXO token is presented with respect to parent UTXO token 602*a* (and child UTXO tokens 602*b*, 602*c*), in some embodiments, the discussion equally applies to all other parent and child UTXO tokens in the blockchain network. For example, the value indicated by the UTXO token amount indicator of parent UTXO token 602*c* is equal to the sum of the values indicated by the UTXO token amount indicators of child UTXO tokens 602*d*, 602*c*. As another example, the value indicated by the UTXO token amount indicator of parent UTXO token 602*d* is equal to the sum of the values indicated by the UTXO token amount indicators of child UTXO tokens 602*f*, 602*g*, 602*h*.

In some embodiments, the data structure of a child UTXO token generated from a parent UTXO token may include information or data related to or identifying the UTXO tokens that preceded the child UTXO token in the ancestral line from the genesis UTXO token to the child UTXO token. For instance, FIG. 6 shows example child UTXO token 602*g* (e.g., a child of the parent UTXO token 602*d*) that is a descendant of the ancestral UTXO tokens 602*a*, 602*c*, 602*d* that preceded it along the ancestral line connecting the genesis UTXO token 602*a* to the child UTXO token 602*g* (i.e., UTXO token 602*g* is generated from UTXO token 602*d*, which in turn is generated from UTXO token 602*c*, which in turn is generated from the genesis UTXO token 602*a*). In such cases, when generating the child UTXO token 602*g* from the parent UTXO token 602*d*, the data structure of the child UTXO token 602*g* may include information or data related to or identifying each of the ancestral UTXO tokens 602*a*, 602*c*, 602*d*. For example, the child UTXO token 602*g* may include a previous-tokens array 610*g* listing the token identifiers of the ancestral UTXO tokens 602*a*, 602*c*, 602*d* (e.g., [PP.2020–05–30.0, 0×72, 0×34] as shown in FIG. 6).

In some embodiments, the previous-tokens array of a UTXO token may not include information or data (e.g., such as UTXO token identifiers) of all the ancestral UTXO tokens from a genesis UTXO token to that UTXO token. For instance, the previous-tokens array may include information or data about a limited number of the most recent ancestral UTXO tokens (e.g., less than the number of all the ancestral UTXO tokens). For example, the previous-tokens array in the data structure of a UTXO token may include the UTXO token identifiers of no more than the most recent thirty-two ancestral UTXO tokens of that UTXO token. In some cases, limiting the size of the previous-tokens array to a fixed number of the most recent ancestral UTXO tokens may aid with conserving storage space in the blockchain network, in particular when the UTXO token has had a large number of ancestral UTXO tokens and the previous-tokens array grown in size exceedingly large. In some cases, the fixed number of the most recent ancestral UTXO tokens may be configurable. Although the above example is discussed with respect to a particular UTXO token 602*g*, in some embodiments, the discussion about a UTXO token in the blockchain network including information about all ancestral UTXO tokens equally applies to all UTXO tokens in the blockchain network.

In some embodiments, the data structure of a UTXO token (e.g., child UTXO token generated from an existing parent UTXO token) in a blockchain network may also include a first token identifier identifying the initial UTXO token of the family of UTXO tokens of which that UTXO token is a member. Further, in some embodiments, the data structure of the UTXO token may include a previous-tokens count indicator indicating the number of ancestral UTXO tokens that have been generated since the start of the family of UTXO tokens. For instance, FIG. 6 shows an example UTXO token 602*g* with a data structure including a first token identifier 608*g* identifying the genesis UTXO token 602*a* of the family of UTXO tokens 602*a*-602*h*. In some cases, the first token identifier allows one, such as a blockchain network administrator, to identify the family of tokens to which a particular UTXO token belongs. Further, the data structure of UTXO token 602*g* includes a previous-tokens count indicator 612*g* indicating the number of ancestral UTXO tokens that have existed in the direct lineage from the genesis UTXO token 602*a* to UTXO token 602*g*. For example, the previous-tokens count indicator 612*g* equals three because there are three UTXO tokens in the ancestral line from the genesis UTXO token 602*a* to UTXO token 602g, i.e., UTXO tokens 602a, 602c and 602d. Although the above example is discussed with respect to a particular UTXO token 602g, in some embodiments, the discussion about a UTXO token in the blockchain network including a first token identifier and a previous-tokens count indicator equally applies to all UTXO tokens in the blockchain network.

In some embodiments, the UTXO tokens in a blockchain network can be stablecoins. That is, the value of a UTXO token that is a stablecoin may be pegged to, and backed by, a reserve asset such as but not limited to fiat money, cryptocurrencies, commodities, or combinations thereof. For example, a single UTXO token with assigned value of one unit may be pegged to and backed by some amount of US dollar, bitcoin cryptocurrency, gold, etc. In some cases, stablecoins can be advantageous as they are likely to have low price volatility because of being pegged to and backed by reserve assets.

In some embodiments, one or more transactions conducted on a blockchain network may generate, from a genesis UTXO token (e.g., such as UTXO token 602a) having a larger value, multiple child UTXO tokens having much smaller values (e.g., such as child UTXO tokens 602f, 602g, 602h). That is, using FIG. 6 as a non-limiting example, the single genesis UTXO token 602a (having a value of 10 units) may spawn a large number of (e.g., thousands, millions, etc.) child UTXO tokens having values that are fractions of the value of the genesis UTXO token 602a after one or more transactions involving the partitioning of the genesis UTXO token 602a and/or its descendant UTXO tokens. Using such small-valued UTXO tokens for transactions on the blockchain network, however, can be highly inefficient, because the transactions may include a large number or instances of UTXO token transfers that have to be validated to be recorded in the blockchain of the blockchain network. For example, a user of a blockchain network having in her/his account or wallet a large number of small-valued UTXO tokens totaling a larger amount and wishing to make a payment to a different account for the same larger amount may have to execute as many UTXO token transfer transactions as the large number of small-valued UTXO tokens to effect the payment, which may burden the computational resources of the blockchain network, the servers and client devices used for the transactions, and importantly, the network bandwidth between nodes that allows for the propagation of data.

For instance, referring to FIG. 1, first user 110 may wish to pay second user 115 ten units of value in UTXO tokens for a product delivered or service rendered, and may request the server 150, via the client device 120, to have the payment transfer transaction executed on the blockchain network 130, i.e., the first user 110 may use the client device 120 to have UTXO tokens totaling ten units to be transferred from an account on the blockchain network 130 of the first user to an account on the blockchain network 130 of the second user 115. The server 150 may then send the requested transaction to the blockchain network 130 to be validated and approved as discussed above. In some instances, the account of the first user 110 on the blockchain network 130 may have a single UTXO token with a value of ten units, and in such instances, the payment transfer transaction may include only a single instance of UTXO token transfer transaction transferring the single UTXO token from the account of first user 110 to the account of second user 115. If, on the other hand, the UTXO tokens to be used for the payment are thousands of small-valued UTXO tokens with an aggregate value of ten units, the payment transfer transaction transferring the thousands of small-valued UTXO tokens from the account of first user 110 to the account of second user 115 may include as many instances of UTXO token transfer transactions as the number of thousands of small-valued UTXO tokens, massively increasing the memory, computational resource, and network bandwidth requirements on the nodes of the blockchain network 130 to validate the transfer transactions and include records thereof into blocks of the blockchains of the blockchain network 130. This is because the memory and computational resource requirements on the nodes of the blockchain network 130 to validate and record payment transfer transactions that transfer a small-valued UTXO token from one account to another are at least substantially the same as those for higher-valued UTXO token. As such, token transfer transactions on a blockchain network 130 that involve the transfer of multiple small-valued UTXO tokens with some aggregate value are much less efficient and place a significant burden on the operational capabilities of the nodes and the blockchain network 130 as a whole compared to a token transfer transaction that involves the transfer of a single UTXO token having the aggregate value. Additionally, a significant additional computational burden is placed on the user computing device that initiates the multiple smaller transactions, as this machine has to make multiple different requests to a blockchain according to various scenarios.

In some embodiments, the afore-mentioned inefficiency, and network and computational resource burden on blockchain networks due to having to transfer multiple small-valued UTXO tokens as part of a payment transfer transaction on the blockchain network (e.g., in contrast to transferring a single UTXO token having same aggregate value of the multiple small-valued UTXO tokens) may be addressed by converting or combining the small-valued UTXO tokens into the single UTXO token and transferring the single UTXO token on the blockchain network as the payment. For example, the multiple small-valued UTXO tokens may be burned or deleted from the blockchain network and in their places a single UTXO token having the same value as the aggregate value of the multiple small-valued UTXO tokens may be minted or created. This approach, however, may result in the newly minted UTXO token lacking the data structure discussed above that allows for the tracking and clawing back of the UTXO token.

Returning to FIG. 6 for an illustrative example, consider the case of a user owning in an account on a blockchain network child UTXO token 602f (having a value of 1 unit) and another UTXO token ("UTXO token X") with a value of 0.7 unit (not shown) from a different UTXO family than the family UTXO tokens 602a-602h. In other words, UTXO token X is a lineal descendant of a genesis UTXO token ("genesis UTXO token X") that is different from genesis UTXO token 602a. The aggregate UTXO token value in the account of the user is then 1+0.7=1.7 units. The data structure of UTXO token X may be same or substantially similar to the data structure of UTXO tokens discussed above that allows for the tracking and clawing back of the UTXO tokens (e.g., same or substantially similar to the data structure of child UTXO token 602f). If this user wishes to transfer from her/his account to another account on the blockchain network a payment of 1.7 units in UTXO tokens, the user can use her/his user device to cause the execution of two payment transfer transactions on the blockchain network as discussed above, the two transactions transferring UTXO token 602f and UTXO token X separately or individually to the other account.

As noted above, the memory and computational burden as well as associated costs and blockchain operational inefficiencies can be significantly reduced (e.g., by about half) by combining or bundling UTXO token 602*f* and UTXO token X into a single UTXO token that can be transferred to the other account via a single payment transfer transaction. In such instances, however, the combined UTXO token would lack the data structure of UTXO tokens discussed above with respect to FIG. 6 that allows for the tracking and clawing back of the combined UTXO token. For example, because such a combined UTXO token has in effect two genesis UTXO tokens (i.e., genesis UTXO token 602*a* and genesis UTXO token X), it may not be clear which one or what should be listed as the first token identifier of the combined UTXO token. In some cases, listing the identifier of either as the first token identifier may be inaccurate or incomplete (e.g., because the listing would leave out the identifier of the other genesis UTXO token) and listing both may result in the combined UTXO token having a different data structure from the data structure discussed above that allows for the tracking and clawing back of UTXO tokens (e.g., which has only one entry for the first token identifier of a UTXO token).

Accordingly, there is a need for mechanisms that allow, as part of a payment transfer transaction on a blockchain network, transferring multiple small-valued UTXO tokens without modifying the data structure thereof, as well as without the blockchain network incurring the elevated memory and computational burden, associated costs and operational inefficiencies that are attendant with transferring the multiple small-valued UTXO tokens individually or separately. It is to be understood that, although the discussion above refers to "multiple small-valued UTXO tokens," the disclosure herein equally applies to multiple UTXO tokens that may have any values (e.g., high values). That is, the disclosure herein applies equally to transactions that involve a payment transfer in UTXO tokens from a blockchain network account that stores or holds multiple UTXO tokens, where each UTXO token has less value than the amount of the payment but the aggregate value of some or all of the multiple UTXO tokens to be transferred exceeds the given payment amount (e.g., and as such these UTXO tokens can be used for the payment).

Delegated Accounts

Figure 7:
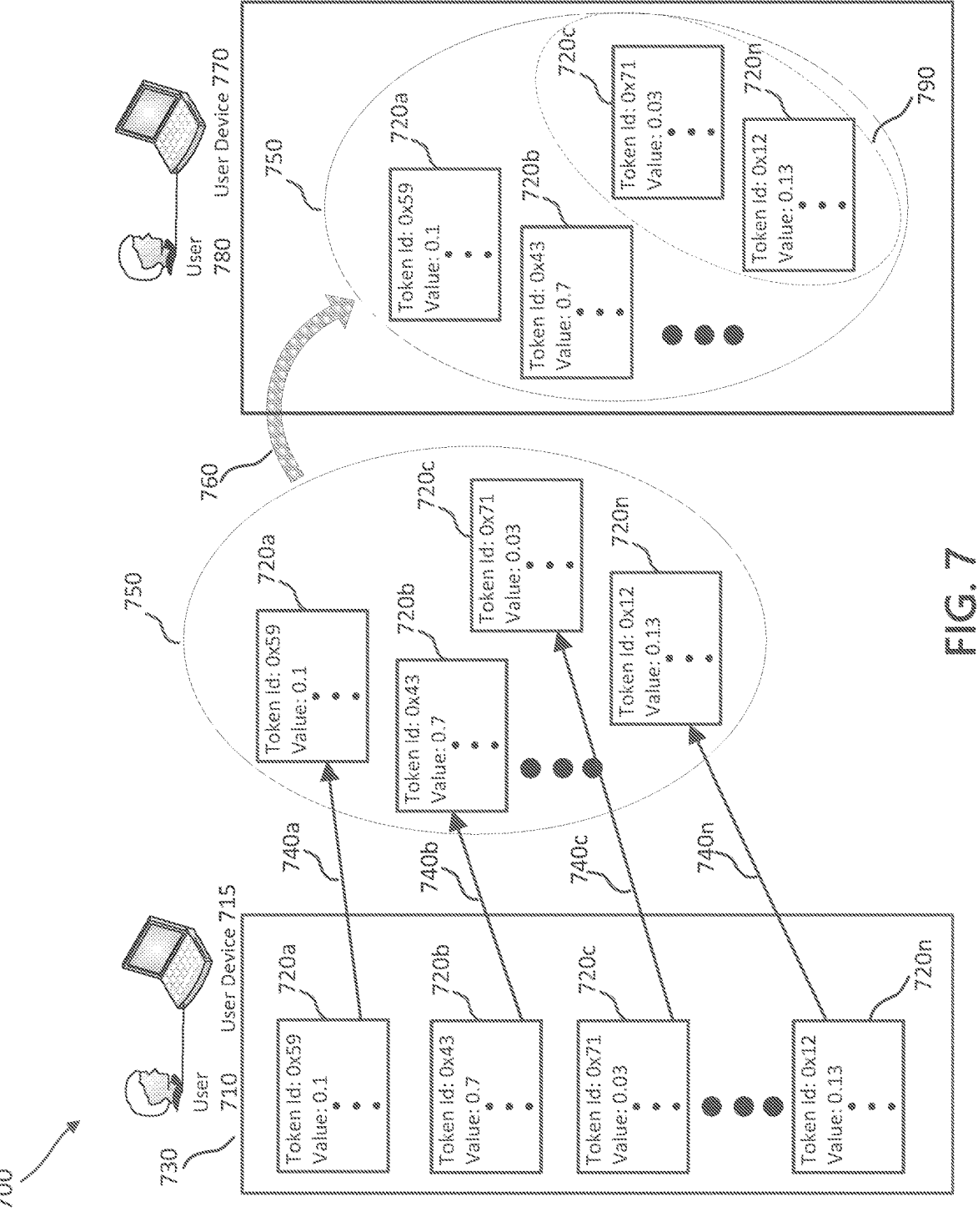
FIG. 7 is an example illustration of the transferring of multiple UTXO tokens using a delegated account according to various aspects of the present disclosure.

FIG. 7 is an example diagram illustrating the use of a delegated account to transfer ownership of multiple UTXO tokens on a blockchain network from a first user of the blockchain network to a second user, according to various aspects of the present disclosure. In some embodiments, a first user 710 may wish to make a payment on a blockchain network to a second user 780. For example, the first user 710 may have an account 730 on a blockchain network having or storing multiple UTXO tokens 720*a*-720*n*, and each one of the multiple UTXO tokens 720*a*-720*n* may have a value less than the payment, necessitating the need for the first user 710 to transfer ownership of more than one of the multiple UTXO tokens 720*a*-720*n* as the payment. The multiple UTXO tokens 720*a*-720*n* may have the same or at least substantially similar data structure as the UTXO tokens of the family of UTXO tokens 602*a*-602*n*. That is, each of the multiple UTXO tokens 720*a*-720*n* may include a token identifier uniquely identifying that UTXO token on the blockchain network, a UTXO token amount indicator indicating the value of that UTXO token, a first token identifier identifying the first or genesis UTXO token that spawned that UTXO token, a previous-tokens array listing the identifiers of the ancestral UTXO tokens that preceded that UTXO token and a previous-tokens count indicator indicating the number of the ancestral UTXO tokens since the inception of the genesis UTXO token.

As discussed above, it may not be desirable to either individually transfer some or all of the multiple UTXO tokens 720*a*-720*n* (e.g., to avoid the blockchain network operational inefficiencies and burden on the nodes that would be caused by such transfers, as well as the computational burden and inefficiency placed on the requesting user computing device that initiates such multiple transfers and the servers (e.g., server 150, 152 in FIG. 1) that facilitate the transfers). Further, it may not be desirable to combine the UTXO tokens into a single UTXO token with value equal to or greater than the value of the payment (e.g., because the combined UTXO token may not have the data structure that allows for tracking and clawing back UTXO tokens on the blockchain network). Accordingly, a delegated account 750 may be used to transfer ownership of the multiple UTXO tokens 720*a*-720*n* from the first user 710 to the second user 780 as the payment from the former to the latter. Although FIG. 7 shows the ownership transfer of all of the multiple UTXO tokens 720*a*-720*n* as the payment, it is to be understood that the ownership of less than all of the UTXO tokens 720*a*-720*n* may be transferred as the payment provide the aggregate value of the transferred UTXO tokens at least equals the payment amount.

In some embodiments, the first user 710 may use the user device 715 to generate a delegated account 750 on the blockchain network and transfer thereto the multiple UTXO tokens 720*a*-720*n* the ownership of which is to be transferred to the second user 780. The transfer 740*a*, 740*b*, 740*c*, . . . , 740*n* of the multiple UTXO tokens 720*a*-720*n* into the delegated account may not affect the data structures of the multiple UTXO tokens 720*a*-720*n*. That is, the data structures of the multiple UTXO tokens 720*a*-720*n* after the transfer into the delegated account 750 may remain the same as the data structures of the same UTXO tokens prior to the transfer while stored in the account 730.

In some embodiments, the delegated account may have associated therewith a blockchain address that is computed from a public key on the blockchain network of the first user 710, which in turn may be derived from a private key of the first user 710. For instance, the first user 710 may use the user device 715 to apply a cryptographic hash function to the private key of the first user 710 to generate the public key, and further apply the same or different cryptographic hash function to the public key to generate the blockchain address of the delegated account 750. In some embodiments, the first user 710 may not use the user device 715 to generate the blockchain address of the delegated account 750 as described above, but instead may transmit a request to a computing device of an administrator of the blockchain network to have a blockchain address generated for the delegated account 750.

In some embodiments, after the generation of the delegated account 750 and the transfer of the multiple UTXO tokens 720*a*-720*n* into the delegated account 750, data related to the delegated account 750 and its owner, the first user 710, may be recorded in a mapping data structure of the blockchain network, such as but not limited to a Hash Map, that is configured to record ownership information of delegated accounts on the blockchain network. For example, the first user 710 may use the user device 715 to transmit a request to the computing device of the administrator of the blockchain network to have the delegated account 750 recorded in the mapping data structure. For instance, the request may include the data related to the delegated account

750 and the owner, the first user 710. Upon receiving the request, the blockchain network administrator may then use her/his computing device to record an indication in the mapping data structure associating the blockchain address of the delegated account 750 to the blockchain address of the first user 710. For example, the indication can be a map in the mapping data structure relating or associating the blockchain address of the delegated account 750 to the blockchain address of the first user 710. In some instances, the mapping data structure may be stored on the blockchain network or off-blockchain (i.e., in a storage device such as a server that is not part of the blockchain network).

In some embodiments, the first user 710 may use the user device 715 to request a server configured to facilitate transactions between entities on the blockchain network (e.g., such as server 150 in FIG. 1) to facilitate a transaction 760 that transfers ownership of the delegated account 750 from the first user 710 to the second user 780. In such cases, the server may then send the requested transaction to one of the blockchain network (e.g., to the nodes constituting the blockchain networks) to be validated and approved as discussed below. For example, the request may identify the delegated account 750 to be transferred, the blockchain address of the delegated account 750, the public key or blockchain address of an account of the user 710, the public key of the second user 780, etc. In some cases, the request may also include additional information such as but not limited to information about the multiple UTXO tokens 720a-720n included in the delegated account 750 (e.g., UTXO token identifiers), etc. In some instances, upon receiving the request from the server, the blockchain network (e.g., one or more of the nodes constituting the blockchain networks) may validate the transaction as discussed above. For example, the validating node(s) may check that the first user 710 is in fact the rightful owner of the delegated account 750 and is authorized to transfer ownership thereof (e.g., by verifying that the signature used to authorize the transaction 760 belongs to the user 710). The validating node(s) may also check that the delegated account in fact includes the multiple UTXO tokens 720a-720n that the request from the user device 715 has indicated as being stored in the delegated account 750. The validating node(s) may then record the transfer transaction transferring ownership of the delegate account 750 to the second user 780 on the blockchain of the blockchain network upon completing the validation process.

In validating the transaction 760 that transfers ownership of the delegated account 750 from the first user 710 to the second user 780, in some instances, the blockchain network or the validating nodes may not validate the individual transfer of one or more of the multiple UTXO tokens 720a-720n included in the delegated account 750. Instead, the transaction 760 that is validated and recorded in the blockchain is the transaction 760 that transferred the ownership of the delegated account 750 from the first user 710 to the second user 780. In other words, even though the transaction 760 effectively transfers the ownership of each of the transferred UTXO tokens 720a-720n from the first user 710 to the second user 780, the blockchain network validates a single transaction 760 for the transfer of the ownership of the delegated account 750 that holds the multiple UTXO tokens 720a-720n from the first user 710 to the second user 780, without validating separate individual transactions for the transfer of the individual UTXO tokens 720a-720n. Further, the data structures of the multiple UTXO tokens 720a-720n remain unchanged after the transaction 760, i.e., the transaction 760 does not alter the data structures of the multiple UTXO tokens 720a-720n which allow for the tracking and clawing back of the UTXO tokens 720a-720n on the blockchain network.

In some embodiments, the delegated account 750 may be a multi-signature account having multiple associated keys configured for authorizing transactions involving the delegated account 750 or the UTXO tokens 720a-720n in the delegated account 750. For instance, the multiple keys may be used for authorizing the transfer of the UTXO tokens 720a-720n from the delegated account 750 to another account. In some cases, one or more of the multiple keys may be configured for use in deactivating the rest of the multiple keys. In such cases, the first user 710 may use the user device 715 to transmit to the user device 770 of the second user 780 the one or more of the multiple keys that are configured for use in deactivating the rest of the multiple keys. In some instances, upon receiving those one or more of the multiple keys, the user 780 may use the received one or more of the multiple keys to deactivate, utilizing the user device 770, the rest of the multiple keys. Further, the user 780 may use the received one or more of the multiple keys to generate, utilizing the user device 770, one or more new keys for use in authorizing transactions involving the delegated account 750 or the UTXO tokens 720a-720n in the delegated account 750 that the user 780 owns after the transaction 760 that transferred the ownership of the delegated account 750 to the user 780.

In some embodiments, UTXO tokens that are associated with a first delegated account may be further associated with a second delegated account based on the number of delegated accounts that the UTXO tokens are already associated with. For example, the second user 780 may use the user device 770 to generate a delegated account 790 and attempt to associate, with the delegated account 790, some of the UTXO tokens (e.g., UTXO tokens 720c and UTXO token 720n) that are stored in or associated with the delegated account 750. For instance, the second user 780 may transmit using the user device 770 a request to a computing device of the administrator of the blockchain network to have the delegated account 790 recorded in the mapping data structure of the blockchain network. In other words, the second user 780 may use the user device 770 to transmit a request to have the delegated account 790 associated with the delegated account 750 by having a pairwise association (e.g., as a "key-value" pair where the "key" and the "value" are respectively the blockchain addresses of the delegated accounts 750 and 790) recorded in the mapping data structure. The recordation of the pairwise association may be viewed as a confirmation that the delegated account 750 has ownership of the delegated account 790).

In some instances, if the number of delegated accounts that a delegated account 790 is associated with exceeds a threshold number of delegated accounts, then the request may be rejected, and the delegated account may not be recorded in the mapping data structure. For example, with reference to FIG. 7, if the threshold number of delegated accounts is zero (i.e., no delegated account is allowed to own another delegated account), then delegated account 790 may be rejected and the pairwise association may not be recorded in the mapping data structure of the blockchain network. If, on the other hand, the threshold number of delegated accounts is greater than zero, then, delegated account 790 is valid and may be associated with delegated account 750. In such cases, delegated account 750 may be considered to have ownership of the delegated account 790, i.e., the blockchain address of the delegated account 790 may be associated with the blockchain address of the delegated account 750 in the mapping data structure via a mapping that relates the former to the latter.

Based on the above discussions, the present disclosure offers several significant advantages. It is understood, however, that not all advantages are necessarily discussed in detail herein, different embodiments may offer different advantages, and that no particular advantage is required for all embodiments. One advantage is improved functionality of computing nodes that make up a blockchain network. As discussed above, a genesis UTXO token of a given initial value, however large, may be partitioned into multiple (e.g., several, dozens, thousands, millions, etc.) small-valued UTXO tokens after the genesis UTXO token and its descendant UTXO tokens are used or involved in several rounds of payment transfer transactions on the blockchain. Combining these partitioned UTXO tokens into a single larger-valued UTXO token to make a payment equaling the aggregate value of the partitioned UTXO tokens may result in the single larger-valued UTXO token losing the data structure that allows for the tracking and clawing back of the UTXO token. (Accordingly, various blockchain schemas that use tracking and clawing back of tokens may forbid or restrict the combination of smaller tokens into a larger token, as this may interfere with the lineage tracking mechanism(s) used by those tokens).

Using multiple partitioned UTXO tokens to make a payment, however, can place a significant burden on the network, computational and memory resources of the blockchain network executing the transaction, because the payment can include a large number (e.g., thousands, millions, etc.) of smaller-valued UTXO token transactions each of which has to be validated and included in the blockchain of the blockchain network, a highly inefficient process that degrades the performance of the blockchain network. Further, the transactions may place significant burdens on the user devices and severs that are also involved in the transactions. In contrast, the methods and systems of the present disclosure employ a delegated account that stores the multiple partitioned UTXO tokens, and transferring the ownership of the delegated account from one user of the blockchain network to another in a single transaction places a significantly lessened burden on the blockchain network, user devices and server(s) that facilitate the transaction, because the user devices and servers have to process the single transaction and the nodes of the blockchain network only have to validate the single transaction even though the transfer of the delegated account effectively transfers a large number of UTXO tokens from one account to another. As such, the solutions introduced in the instant disclosure significantly improve the performance of a blockchain network by reducing the memory, network and computational burden associated with transferring multiple smaller-valued UTXO tokens on the blockchain network (e.g., in contrast to transferring a UTXO token with a value equal to the aggregate value of the multiple UTXO tokens).

Figure 8:
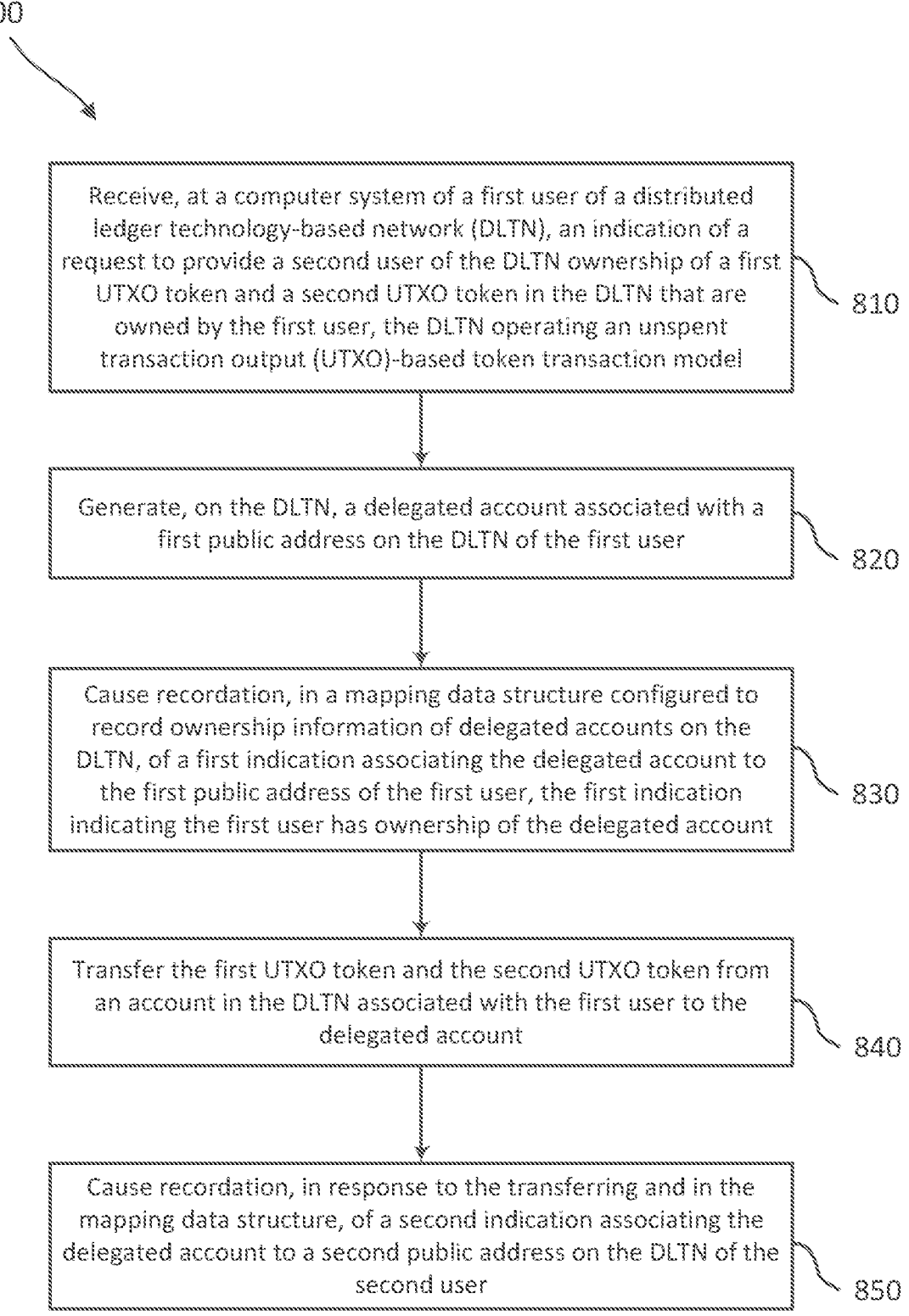
FIG. 8 is a flowchart illustrating a method of transferring of multiple UTXO tokens using a delegated account according to various aspects of the present disclosure.

FIG. 8 is a flowchart illustrating a method of transferring of multiple UTXO tokens using a delegated account according to various aspects of the present disclosure. The various steps of the method 800, which are described in greater detail above, may be performed by a computer system (e.g., or by processors of such computer systems). In some embodiments, one or more of the steps of the method 800 may be performed by one or more of the client devices 120/125, the servers 150/152, computing nodes 205 of the blockchain network 130, and/or the computer system 1100 according to various embodiments. Further, it is understood that additional method steps may be performed before, during, or after the steps 810-850 discussed below. In addition, in some embodiments, one or more of the steps 810-850 may be omitted or performed in different orders.

In some embodiments, the method 800 includes the step 810 of receiving, at a computer system of a first user of a blockchain network, an indication of a request to provide a second user of the blockchain network ownership of a first UTXO token and a second UTXO token in the blockchain network that are owned by the first user, the blockchain network operating an unspent transaction output (UTXO)-based token transaction model. For example, the second user can use her/his user device to communicate a message to the first user via the user device of the first user requesting a payment with an amount equaling or exceeding the aggregate value of the first UTXO token and the second UTXO token.

In some embodiments, the method 800 includes the step 820 of generating, on the blockchain network, a delegated account associated with a first blockchain address on the blockchain network of the first user.

In some embodiments, the method 800 includes the step 830 of causing recordation, in a mapping data structure configured to record ownership information of delegated accounts on the blockchain network, of a first indication associating the delegated account to the first blockchain address of the first user, the first indication indicating the first user has ownership of the delegated account. For instance, the recordation of the first indication may include recording, in the mapping data structure, the delegated account (e.g., a blockchain address of the delegated account) and the first blockchain address of the first user, as a "key-value" pair of the mapping data structure mapping the delegated account to the first blockchain address. That is, in some instances, the first indication is a mapping in the mapping data structure relating or mapping the delegated account to the first blockchain address of the first user (e.g., to denote ownership of the delegated account by the first user). It is to be noted that a "key-value" pair is a non-limiting example of a method of associating the delegated account with the blockchain address of a user, and that any other recordation mechanism that associates the delegated account with the blockchain address can also be used.

In some embodiments, the method 800 includes the step 840 of transferring the first UTXO token and the second UTXO token from an account in the blockchain network associated with the first user to the delegated account.

In some embodiments, the method 800 includes the step 850 of causing recordation, in response to the transferring and in the mapping data structure, of a second indication associating the delegated account to a second blockchain address on the blockchain network of the second user. In some instances, the second indication indicates that the second user has ownership of the delegated account. In some instances, the causing recordation of the second indication occurs without execution of a transaction on the blockchain network to individually transfer one or both of the first UTXO token and the second UTXO token to an account in the blockchain network associated with the second user.

Some embodiments of the present disclosure include a system that includes a non-transitory memory and one or more hardware processors coupled to the non-transitory memory and configured to read instructions from the non-transitory memory to cause the system to perform operations comprising: receiving, at a computer system of a first user of a blockchain network, an indication of a request to provide a second user of the blockchain network ownership of a first UTXO token and a second UTXO token in the blockchain network that are owned by the first user, the blockchain network operating an unspent transaction output (UTXO)-based token transaction model; generating, on the blockchain network, a delegated account associated with a first blockchain address on the blockchain network of the first user; causing recordation, in a mapping data structure configured to record ownership information of delegated accounts on the blockchain network, of a first indication associating the delegated account to the first blockchain address of the first user, the first indication indicating the first user has ownership of the delegated account; transferring the first UTXO token and the second UTXO token from an account in the blockchain network associated with the first user to the delegated account; and causing recordation, in response to the transferring and in the mapping data structure, of a second indication associating the delegated account to a second blockchain address on the blockchain network of the second user. In some instances, the second indication indicates that the second user has ownership of the delegated account. In some instances, the causing recordation of the second indication occurs without execution of a transaction on the blockchain network to individually transfer one or both of the first UTXO token and the second UTXO token to an account in the blockchain network associated with the second user.

Some embodiments of the present disclosure include a non-transitory machine-readable medium having stored thereon machine-readable instructions executable to cause a machine to perform operations comprising: receiving, at a computer system of a first user of a blockchain network, an indication of a request to provide a second user of the blockchain network ownership of a first UTXO token and a second UTXO token in the blockchain network that are owned by the first user, the blockchain network operating an unspent transaction output (UTXO)-based token transaction model; generating, on the blockchain network, a delegated account associated with a first blockchain address on the blockchain network of the first user; causing recordation, in a mapping data structure configured to record ownership information of delegated accounts on the blockchain network, of a first indication associating the delegated account to the first blockchain address of the first user, the first indication indicating the first user has ownership of the delegated account; transferring the first UTXO token and the second UTXO token from an account in the blockchain network associated with the first user to the delegated account; and causing recordation, in response to the transferring and in the mapping data structure, of a second indication associating the delegated account to a second blockchain address on the blockchain network of the second user. In some instances, the second indication indicates that the second user has ownership of the delegated account. In some instances, the causing recordation of the second indication occurs without execution of a transaction on the blockchain network to individually transfer one or both of the first UTXO token and the second UTXO token to an account in the blockchain network associated with the second user.

In some embodiments, the causing recordation of the second indication includes replacing the first indication with the second indication, indicating a transfer of the ownership of the first UTXO token and the second UTXO token on the DLN from the second user to the first user. For example, the first indication in the mapping data structure relating or mapping the delegated account to the first blockchain address of the first user may be deleted, or indicated as invalid otherwise, and the second indication relating or mapping the delegated account to the second blockchain address of the second user may be recorded in the mapping data structure. For instance, the delegated account (e.g., a blockchain address of the delegated account) and the second blockchain address of the second user may be recorded in the mapping data structure as a "key-value" pair associating the delegated account or blockchain address thereof (i.e., the "key") with the second blockchain address of the second user (i.e., the "value"), and as such indicating new ownership of the delegated account by the second user.

In some embodiments, the delegated account is a multi-signature account associated with a first plurality of keys configured for authorizing transactions that are related to the delegated account, one of the plurality of keys configured for use in generating a second plurality of keys different from the first plurality of keys. In some instances, the method 800 and the aforementioned operations further include the step of providing the one of the first plurality of keys to a computer system associated with the second user.

In some embodiments, the causing recordation of the second indication occurs without execution of a transaction on the blockchain network to combine the first UTXO token and the second UTXO token into a single UTXO token. That is, the second indication may be recorded in the mapping data structure without any transaction executing on the blockchain network to combine the first UTXO token and the second UTXO token into a single UTXO token (e.g., no transaction takes place on the blockchain network that results in the burning or otherwise deleting of the first UTXO token and the second UTXO token and in the generation of a new UTXO token in their place, where the new UTXO token has same or substantially similar value as the aggregate of the first UTXO token and the second UTXO token, for example).

In some embodiments, the first UTXO token includes a UTXO data structure having a genesis token identifier that identifies at least one of a genesis UTXO token from which the first UTXO token is descended and a previous tokens array including ancestral token identifiers of ancestral UTXO tokens that are lineal ancestors of the first UTXO token. In some instances, the causing recordation of the second indication occurs without a change to the genesis token identifier and/or the previous tokens array.

FIG. 9 is a flowchart illustrating a method of transferring of multiple UTXO tokens using a delegated account according to various aspects of the present disclosure. The various steps of the method 900, which are described in greater detail above, may be performed by a computer system (e.g., or by processors of such computer systems). In some embodiments, at least some of the steps of the method 900 may be performed by one or more of the client devices 120/125, the servers 150/152, computing nodes 205 of the blockchain network 130, and/or the computer system 1100. Further, it is understood that additional method steps may be performed before, during, or after the steps 910-950 discussed below. In addition, in some embodiments, one or more of the steps 910-950 may be omitted or performed in different orders.

In some embodiments, the method 900 includes the step 910 of receiving, from a first computer system of a first user of a blockchain network, an indication of a first request to record, in a mapping data structure configured to record ownership information of delegated accounts on the blockchain network, a first indication associating a delegated account to a first blockchain address of the first user. In some instances, the blockchain network operates an unspent transaction output (UTXO)-based token transaction model. In some instances, the first indication indicates that (i) the delegated account includes a first UTXO token and a second UTXO token and (ii) the first user has ownership of the delegated account.

In some embodiments, the method 900 includes the step 920 of recording, in the mapping data structure, the first indication associating the delegated account to the first blockchain address of the first user. For example, the first indication can be or include a mapping in the mapping data structure relating or mapping the delegated account (e.g., a blockchain address of the delegated account) to the first blockchain address of the first user. For instance, the first indication can be "key-value" pair of the blockchain address of the delegated account and the first blockchain address of the first user in the mapping data structure.

In some embodiments, the method 900 includes the step 930 of receiving, from the first computer system, an indication of a second request to record, in the mapping data structure, a second indication associating the delegated account to a second blockchain address of the second user.

In some embodiments, the method 900 includes the step 940 of checking, in response to the receiving the first request or the receiving the second request, that the delegated account includes the first UTXO token and the second UTXO token.

In some embodiments, the method 900 includes the step 950 of recording, in the mapping data structure and based on the checking, the second indication to indicate the second user has ownership of the delegated account. In some instances, the recording the second indication occurs without execution of a transaction on the blockchain network to combine the first UTXO token and the second UTXO token into a single UTXO token. That is, the second indication may be recorded in the mapping data structure without any transaction executing on the blockchain network to combine the first UTXO token and the second UTXO token into a single UTXO token.

Some embodiments of the present disclosure include a system that includes a non-transitory memory and one or more hardware processors coupled to the non-transitory memory and configured to read instructions from the non-transitory memory to cause the system to perform operations comprising: receiving, from a first computer system of a first user of a blockchain network, an indication of a first request to record, in a mapping data structure configured to record ownership information of delegated accounts on the blockchain network, a first indication associating a delegated account to a first blockchain address of the first user; recording, in the mapping data structure, the first indication associating the delegated account to the first blockchain address of the first user; receiving, from the first computer system, an indication of a second request to record, in the mapping data structure, a second indication associating the delegated account to a second blockchain address of the second user; checking, in response to the receiving the first request or the receiving the second request, that the delegated account includes the first UTXO token and the second UTXO token; and recording, in the mapping data structure and based on the checking, the second indication to indicate the second user has ownership of the delegated account. In some instances, the blockchain network operates an unspent transaction output (UTXO)-based token transaction model. In some instances, the first indication indicates that (i) the delegated account includes a first UTXO token and a second UTXO token and (ii) the first user has ownership of the delegated account. In some instances, the recording the second indication occurs without execution of a transaction on the blockchain network to combine the first UTXO token and the second UTXO token into a single UTXO token.

Some embodiments of the present disclosure include a non-transitory machine-readable medium having stored thereon machine-readable instructions executable to cause a machine to perform operations comprising: receiving, from a first computer system of a first user of a blockchain network, an indication of a first request to record, in a mapping data structure configured to record ownership information of delegated accounts on the blockchain network, a first indication associating a delegated account to a first blockchain address of the first user; recording, in the mapping data structure, the first indication associating the delegated account to the first blockchain address of the first user; receiving, from the first computer system, an indication of a second request to record, in the mapping data structure, a second indication associating the delegated account to a second blockchain address of the second user; checking, in response to the receiving the first request or the receiving the second request, that the delegated account includes the first UTXO token and the second UTXO token; and recording, in the mapping data structure and based on the checking, the second indication to indicate the second user has ownership of the delegated account. In some instances, the blockchain network operates an unspent transaction output (UTXO)-based token transaction model. In some instances, the first indication indicates that (i) the delegated account includes a first UTXO token and a second UTXO token and (ii) the first user has ownership of the delegated account. In some instances, the recording the second indication occurs without execution of a transaction on the blockchain network to combine the first UTXO token and the second UTXO token into a single UTXO token.

In some embodiments, the delegated account is a first delegated account; and method 900 and the afore-mentioned operations comprise receiving an indication of a third request to record, in the mapping data structure, a third indication associating the first delegated account to a third blockchain address on the DLN of a second delegated account, the third indication configured to indicate the second delegated account has ownership of the first delegated account; checking the mapping data structure to determine a number of delegated accounts indicated in the mapping data structure as having ownership of the first delegated account; and recording the third indication in the mapping data structure based on the number of delegated accounts indicated in the mapping data structure as having ownership of the first delegated account. In some instances, the recording the third indication includes recording the third indication in the mapping data structure when the number of delegated accounts is less than a threshold number of delegated accounts.

For example, with reference to FIG. 7, the third request may be a request to record the third indication in the mapping data structure, associating the delegated account 790 (e.g., the "first delegated account") with the delegated account 750 (e.g., the "second delegated account"). That is, the request may be to have the first blockchain address of the first delegated account 790 associated with the third blockchain address of the second delegated account 750 in the mapping data structure (e.g., the third indication can be a "key-value" pair mapping the key to the value, where the "key" is the first blockchain address and the "value" is the third blockchain address). When recorded in the mapping data structure, the third indication may be considered as an indication or confirmation that the second delegated account 750 having third blockchain address has ownership of the first delegated account 790 having the first blockchain address. In some cases, the third indication may not be recorded in the mapping data structure if the number of delegated accounts that have ownership of the delegated account 790 exceeds a threshold number of delegated accounts. For example, if another delegated account (i.e., different from second delegated account 750) is associated with the first delegated account 790 in the mapping data structure (i.e., this other delegated account is indicated as having ownership of the first delegated account 790) and the threshold number of delegated accounts is one, then the third indication may not be recorded in the mapping data structure. Otherwise, i.e., if the threshold number of delegated accounts is greater than one, the third indication may be recorded in the mapping data structure associating the first delegated account 790 with the second delegated account 750 indicating that the latter has ownership of the former.

In some embodiments, the recording the second indication occurs without execution of a transaction on the blockchain network to individually transfer one or both of the first UTXO token and the second UTXO token to an account in the blockchain network associated with the second blockchain address. In some instances, the checking includes checking that the delegated account includes the first UTXO token and the second UTXO token without checking to verify the transaction on the blockchain network. For example, as discussed above with reference to FIG. 7, ownership of the UTXO tokens 720a-720n may be transferred from first user 710 to second user 780 by utilizing the delegated account 750 without executing individual transactions to transfer the UTXO tokens 720a-720n individually from the account 730 to an account of the second user 780 on the blockchain network. As such, to record the new ownership of the UTXO tokens 720a-720n in the mapping data structure by the user 780 (e.g., by recording in the mapping data structure a mapping relating the blockchain address of the delegated account 750 to the blockchain address of the user 780), one may check that the delegated account 750 contains the UTXO tokens 720a-720n without having to check the blockchain for individual transactions that individually transferred the UTXO tokens 720a-720n to an account of the user 780.

In some embodiments, the first UTXO token and/or the second UTXO token are stablecoins. In some embodiments, the first UTXO token includes a UTXO data structure having a token identifier uniquely identifying the first UTXO token and a genesis token identifier that identifies at least one of a genesis UTXO token from which the first UTXO token is descended. In some instances, the causing recordation of the second indication occurs without a change to the token identifier and/or the genesis token identifier.

FIG. 10 is a flowchart illustrating a method of transferring of multiple UTXO tokens using a delegated account according to various aspects of the present disclosure. The various steps of the method 1000, which are described in greater detail above, may be performed by a computer system (e.g., or by processors of such computer systems). In some embodiments, at least some of the steps of the method 1000 may be performed by one or more of the client devices 120/125, the servers 150/152, computing nodes 205 of the blockchain network 130, and/or the computer system 1100. Further, it is understood that additional method steps may be performed before, during, or after the steps 1010-1050 discussed below. In addition, in some embodiments, one or more of the steps 1010-1050 may be omitted or performed in different orders.

In some embodiments, the method 1000 includes the step 1010 of sending, from a first computer system of a first user of a blockchain network to a second computer system of a second user of the blockchain network, an indication of a request to transfer ownership of a first UTXO token and a second UTXO token in the blockchain network from the second user to the first user. In some instances, the first UTXO token includes a first UTXO data structure having a first token identifier uniquely identifying the first UTXO token and a first previous tokens array including ancestral token identifiers of first ancestral UTXO tokens that are lineal ancestors of the first UTXO token. In some instances, the second UTXO token includes a second UTXO data structure having a second token identifier uniquely identifying the second UTXO token and a second previous tokens array including ancestral token identifiers of second ancestral UTXO tokens that are lineal ancestors of the second UTXO token. In some instances, the blockchain network operates an unspent transaction output (UTXO)-based token transaction model.

In some embodiments, the method 1000 includes the step 1020 of receiving, at the first computer system of the first user, a confirmation confirming a recordation, in a mapping data structure configured to record ownership information of delegated accounts on the blockchain network, of an indication associating a delegated account to a blockchain address on the blockchain network of the first user. In some instances, the delegated account includes the first UTXO token and the second UTXO token. In some instances, the receiving the confirmation occurs without a change to the first UTXO data structure of the first UTXO token or the second UTXO data structure of the second UTXO token.

Some embodiments of the present disclosure include a system that includes a non-transitory memory and one or more hardware processors coupled to the non-transitory memory and configured to read instructions from the non-transitory memory to cause the system to perform operations comprising: receiving, from a first computer system of a first user of a blockchain network, an indication of a first request to record, in a mapping data structure configured to record ownership information of delegated accounts on the blockchain network, a first indication associating a delegated account to a first blockchain address of the first user; recording, in the mapping data structure, the first indication associating the delegated account to the first blockchain address of the first user; receiving, from the first computer system, an indication of a second request to record, in the mapping data structure, a second indication associating the delegated account to a second blockchain address of the second user; checking, in response to the receiving the first request or the receiving the second request, that the delegated account includes the first UTXO token and the second UTXO token; and recording, in the mapping data structure and based on the checking, the second indication to indicate the second user has ownership of the delegated account. In some instances, the blockchain network operates an unspent transaction output (UTXO)-based token transaction model. In some instances, the first indication indicates that (i) the delegated account includes a first UTXO token and a second UTXO token and (ii) the first user has ownership of the delegated account. In some instances, the recording the second indication occurs without execution of a transaction on the blockchain network to combine the first UTXO token and the second UTXO token into a single UTXO token.

Some embodiments of the present disclosure include a non-transitory machine-readable medium having stored thereon machine-readable instructions executable to cause a machine to perform operations comprising: sending, from a first computer system of a first user of a blockchain network to a second computer system of a second user of the blockchain network, an indication of a request to transfer ownership of a first UTXO token and a second UTXO token in the blockchain network from the second user to the first user; and receiving, at the first computer system of the first user, a confirmation confirming a recordation, in a mapping data structure configured to record ownership information of delegated accounts on the blockchain network, of an indication associating a delegated account to a blockchain address on the blockchain network of the first user. In some instances, the first UTXO token includes a first UTXO data structure having a first token identifier uniquely identifying the first UTXO token and a first previous tokens array including ancestral token identifiers of first ancestral UTXO tokens that are lineal ancestors of the first UTXO token. In some instances, the second UTXO token includes a second UTXO data structure having a second token identifier uniquely identifying the second UTXO token and a second previous tokens array including ancestral token identifiers of second ancestral UTXO tokens that are lineal ancestors of the second UTXO token. In some instances, the blockchain network operates an unspent transaction output (UTXO)-based token transaction model. In some instances, the delegated account includes the first UTXO token and the second UTXO token. In some instances, the receiving the confirmation occurs without a change to the first UTXO data structure of the first UTXO token or the second UTXO data structure of the second UTXO token.

In some embodiments, the indication is a first indication and the recordation of the first indication includes replacing a second indication in the mapping data structure with the first indication, the second indication associating the delegated account to a blockchain address on the blockchain network of the second user. For example, the second indication in the mapping data structure relating or mapping the delegated account to the second blockchain address of the second user may be deleted, and the first indication relating or mapping the delegated account to the first blockchain address of the first user may be recorded in the mapping data structure. In some embodiments, the second indication may not be deleted but rather indicated as expired or invalid. In such cases, the mapping data structure may include records of past owners and as such may serve to track ownership lineage of the data structure.

In some embodiments, the delegated account is a multi-signature account associated with a first plurality of keys configured for authorizing transactions that are related to the delegated account, one of the first plurality of keys configured for use in deactivating the rest of the plurality of keys. In some instances, the method 1000 and the afore-mentioned operations further comprise receiving the one of the first plurality of keys and deactivating the rest of the plurality of keys using the one of the first plurality of keys; and generating a second plurality of keys related to the blockchain address of the first user and configured for authorizing transactions that are related to the delegated account.

In some embodiments, the mapping data structure is a HashMap relating delegated accounts on the DLN to one or more blockchain addresses of respective owners of the delegated accounts.

Computing System

Figure 11:
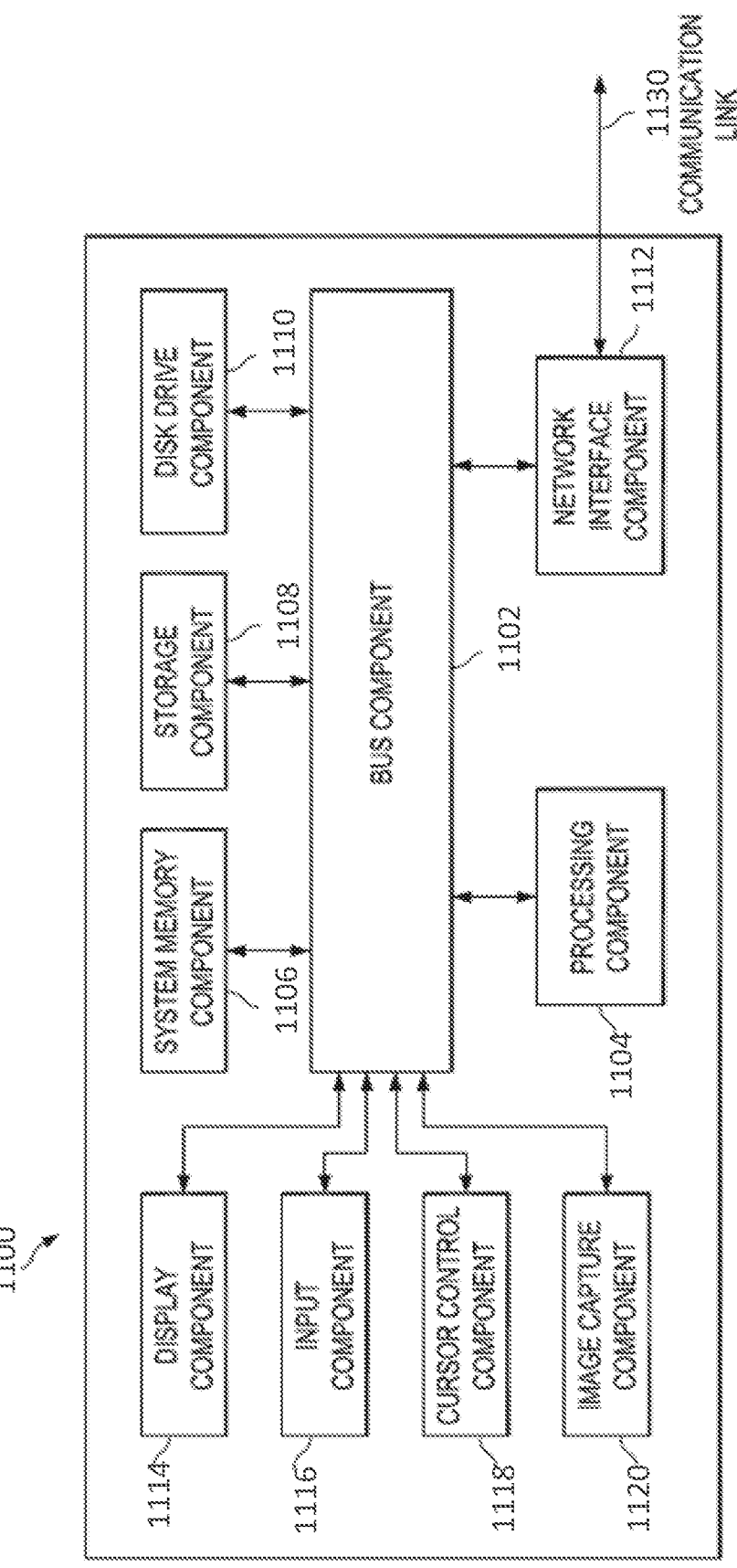
FIG. 11 is an example computer system, according to various aspects of the present disclosure.

FIG. 11 is a block diagram of a computer system 1100 suitable for implementing various methods and devices described herein, for example, the client devices 120/125, the servers 150/152, computing nodes 205 of the blockchain network 130. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), a server, a computing node of a blockchain network, or another suitable device. Accordingly, it should be appreciated that the devices capable of implementing the aforementioned computing nodes, servers, UTXO tokens, and the various method steps of the methods 800, 900 and 1000 discussed above may be implemented as the computer system 1100 in a manner as follows.

In accordance with various embodiments of the present disclosure, the computer system 1100, such as a network server, a mobile communications device, or a computing node of a blockchain network 130, includes a bus component 1102 or other communication mechanisms for communicating information, which interconnects subsystems and components, such as a computer processing component 1104 (e.g., processor, micro-controller, digital signal processor (DSP), graphic processing unit (GPU), central processing unit (CPU), application specific integrated circuit (ASIC), etc.), system memory component 1106 (e.g., RAM), static storage component 1108 (e.g., ROM), disk drive component 1110 (e.g., magnetic or optical), network interface component 1112 (e.g., modem or Ethernet card), display component 1114 (e.g., cathode ray tube (CRT) or liquid crystal display (LCD)), input component 1116 (e.g., keyboard), cursor control component 1118 (e.g., mouse or trackball), and image capture component 1120 (e.g., analog or digital camera). In one implementation, disk drive component 1110 may comprise a database having one or more disk drive components.

In accordance with embodiments of the present disclosure, computer system 1100 performs specific operations by the processor 1104 executing one or more sequences of one or more instructions contained in system memory component 1106. Such instructions may be read into system memory component 1106 from another computer readable medium, such as static storage component 1108 or disk drive component 1110. In other embodiments, hard-wired circuitry may be used in place of (or in combination with) software instructions to implement the present disclosure. In some embodiments, the methods 800, 900 and 1000 may be in the form of software instructions that can be executed by the processor 1104 to automatically perform context-appropriate tasks on behalf of a user.

Logic may be encoded in a computer readable medium, which may refer to any medium that participates in providing instructions to the processor 1104 for execution. Such a medium may take many forms, including but not limited to, non-volatile media and volatile media. In some embodiments, the computer readable medium is non-transitory. In various implementations, non-volatile media includes optical or magnetic disks, such as disk drive component 1110, and volatile media includes dynamic memory, such as system memory component 1106. In one aspect, data and information related to execution instructions may be transmitted to computer system 1100 via a transmission media, such as in the form of acoustic or light waves, including those generated during radio wave and infrared data communications. In various implementations, transmission media may include coaxial cables, copper wire, and fiber optics, including wires that comprise bus 1102.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store UTXO tokens and the programming code for the methods 800, 900 and 1000 discussed above.

In various embodiments of the present disclosure, execution of instruction sequences to practice the present disclosure may be performed by computer system 1100. In various other embodiments of the present disclosure, a plurality of computer systems 1100 coupled by communication link 1130 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 1100 may transmit and receive messages, data, information and instructions, including one or more programs (i.e., application code) through communication link 1130 and communication interface 1112. Received program code may be executed by computer processor 1104 as received and/or stored in disk drive component 1110 or some other non-volatile storage component for execution. The communication link 1130 and/or the communication interface 1112 may be used to conduct electronic communications between the computing nodes 205a-205h of the blockchain network 130 as well as the servers 150.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the UTXO tokens discussed herein may be implemented as such software code.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
receiving a request to conduct a transaction, the request including a first token that is usable on a distributed ledger technology-based network (DLTN), wherein the first token is generated by combining a plurality of other tokens, wherein a value of the first token is based on values of the plurality of other tokens, and wherein the plurality of other tokens are removed from the DLTN after the first token has been generated;
accessing a data structure of the first token, the data structure containing a reference to one or more ancestral tokens from which the first token descend;
determining, based on the data structure, whether the one or more ancestral tokens are on a list of a plurality of second tokens that each meets one or more specified criteria; and
processing, based on a determination that the one or more ancestral tokens are not on the list, the request to conduct the transaction on the DLTN;
wherein one or more of the receiving, the accessing, the determining, or the processing are performed at least in part via a computer system that includes one or more hardware processors.

2. The method of claim 1, wherein the DLTN comprises a blockchain network.

3. The method of claim 1, wherein:
the one or more ancestral tokens comprise an immediate ancestral token of the first token; and
the reference to the one or more ancestral tokens comprises a first identifier that identifies the immediate ancestral token of the first token.

4. The method of claim 3, wherein:
the first token comprises a first unique identifier and the immediate ancestral token comprises a second unique identifier; and
a content of the first identifier comprises at least in part a content of the second unique identifier.

5. The method of claim 4, wherein the first unique identifier is generated at least in part by applying a hashing algorithm to the second unique identifier.

6. The method of claim 3, wherein:
the one or more ancestral tokens further comprise a genesis ancestral token of the first token, the genesis ancestral token also being an ancestral token to the immediate ancestral token of the first token; and
the reference to the one or more ancestral tokens further comprises a second identifier that identifies the genesis ancestral token of the first token.

7. The method of claim 6, wherein:
the genesis ancestral token and the immediate ancestral token each comprises the second identifier; and
a content of the second identifier remains the same in the genesis ancestral token, the immediate ancestral token, and the first token.

8. The method of claim 1, wherein the data structure further comprises a counter that indicates a quantity of the one or more ancestral tokens of the first token.

9. The method of claim 1, wherein the value of the first token comprises a monetary value, and wherein the data structure further comprises a monetary amount indicator that indicates the monetary value of the first token.

10. The method of claim 1, wherein the first token or the one or more ancestral tokens comprises a stablecoin whose value is pegged to a specified reserve asset.

11. The method of claim 1, wherein:

the DLTN comprises a first computing node and a second computing node different from the first computing node; and the transaction comprises a transfer of the first token from the first computing node to the second computing node.

12. A system, comprising:

one or more hardware processors; and a non-transitory computer-readable medium having stored thereon instructions that are executable by the one or more hardware processors to cause the system to perform operations comprising:

receiving a request to conduct a distributed ledger technology-based network (DLTN) transaction, the request including a first token having a data structure, wherein the data structure specifies one or more identifiers associated with one or more ancestral tokens of the first token, wherein the first token is generated based on a combination of a plurality of other tokens, wherein a value of the first token is a function of values of the plurality of other tokens, and wherein the plurality of other tokens are deleted from the DLTN after the first token has been generated;

identifying, based on the one or more identifiers of the data structure, the one or more ancestral tokens of the first token, comparing the one or more ancestral tokens with a plurality of further tokens on a list; and facilitating, based on a result of the comparing indicating that the one or more ancestral tokens are not on the list, the request to conduct the DLTN transaction.

13. The system of claim 12, wherein the facilitating the request comprises transferring the first token from a first computing node of the DLTN to a second computing node of the DLTN.

14. The system of claim 12, wherein:

the one or more ancestral tokens comprise a second token that is an immediate ancestor of the first token and a genesis token from which both the first token and the second token descend; and the data structure further specifies an immediate ancestral token identifier that identifies the second token and a genesis token identifier that identifies the genesis token.

15. The system of claim 14, wherein:

the first token further comprises a first unique identifier that uniquely identifies the first token on the DLTN;

the second token further comprises a second unique identifier that uniquely identifies the second token on the DLTN; and the immediate ancestral token identifier is generated at least in part based on the second unique identifier.

16. The system of claim 15, wherein the first unique identifier is generated at least in part by applying a hashing algorithm to the second unique identifier.

17. The system of claim 12, wherein the data structure further specifies:

a total quantity of the one or more ancestral tokens of the first token; or a value of the first token on the DLTN.

18. A non-transitory machine-readable medium having stored thereon machine-readable instructions executable to cause a machine to perform operations comprising:

receiving a request to transfer a first token from a first node of a blockchain network to a second node of the blockchain network, the first token having a data structure, wherein the first token is generated at least in part by:

aggregating a plurality of other tokens such that a value of the first token is a function of values of the plurality of other tokens; and removing the plurality of other tokens from the blockchain network;

locating, at least in part via an electronic examination of the data structure of the first token, a reference to one or more ancestral tokens of the first token on the blockchain network;

determining, based at least in part on the reference to the one or more ancestral tokens, whether the one or more ancestral tokens are on a clawback list that specifies a list of tokens that are prohibited from being used to conduct transactions on the blockchain network; and transferring, based on a determination that the one or more ancestral tokens are not on the clawback list, the first token from the first node of the blockchain network to the second node of the blockchain network.

19. The non-transitory machine-readable medium of claim 18, wherein the reference to one or more ancestral tokens comprises:

an immediate ancestral token identifier that identifies an immediate ancestral token of the first token; and a genesis token identifier that identifies a genesis token from which both the immediate ancestral token and the first token are generated.

20. The non-transitory machine-readable medium of claim 18, wherein the data structure further comprises:

a counter that indicates a quantity of the one or more ancestral tokens of the first token; or a value indicator that indicates a value of the first token on the blockchain network.

* * * * *